(12) United States Patent
Oledzki

(10) Patent No.: US 11,111,993 B1
(45) Date of Patent: Sep. 7, 2021

(54) CONTINUOUSLY VARIABLE HYDRO-MECHANICAL TRANSMISSION

(71) Applicant: Wieslaw Julian Oledzki, Bialystok (PL)

(72) Inventor: Wieslaw Julian Oledzki, Bialystok (PL)

(*) Notice: Subject to any disclaimer, the term of this patent is extended or adjusted under 35 U.S.C. 154(b) by 0 days.

(21) Appl. No.: 17/120,128

(22) Filed: Dec. 12, 2020

(51) Int. Cl.
F16H 47/04 (2006.01)
F16H 37/08 (2006.01)

(52) U.S. Cl.
CPC ..... *F16H 47/04* (2013.01); *F16H 2037/0866* (2013.01); *F16H 2037/0886* (2013.01)

(58) Field of Classification Search
None
See application file for complete search history.

(56) References Cited

U.S. PATENT DOCUMENTS

| | | | | |
|---|---|---|---|---|
| 5,071,393 A * | 12/1991 | Genovese | .................. | F16H 3/70 475/166 |
| 6,203,466 B1 * | 3/2001 | Ishikawa | .............. | F16H 37/086 475/216 |
| 6,953,412 B2 * | 10/2005 | Braford | ..................... | F16H 3/66 192/3.52 |
| 7,604,559 B2 * | 10/2009 | Fujimoto | .................. | F16H 1/32 475/170 |
| 8,808,130 B2 * | 8/2014 | Wilkins | .................... | F16H 1/32 475/170 |

* cited by examiner

*Primary Examiner* — Colby M Hansen

(57) ABSTRACT

Continuously variable hydro-mechanical transmission includes an input shaft and an output shaft, a torque converter and an eccentric gear set including at least one main gear, a planet gear, a main eccentric and an auxiliary eccentric of adaptable eccentricity, wherein the input shaft is connected to the turbine rotor and one member of the eccentric gear set, the pump rotor is connected to another member of the eccentric gear set, and the output shaft is connected to yet another member of the eccentric gear set. This arrangement introduces strong positive feedback between the pump rotor and the turbine rotor, which results in large maximum torque ratio and large rate of growth of torque ratio, as well as large ratio spread, which can be adapted by changing eccentricity of the auxiliary eccentric.

13 Claims, 31 Drawing Sheets

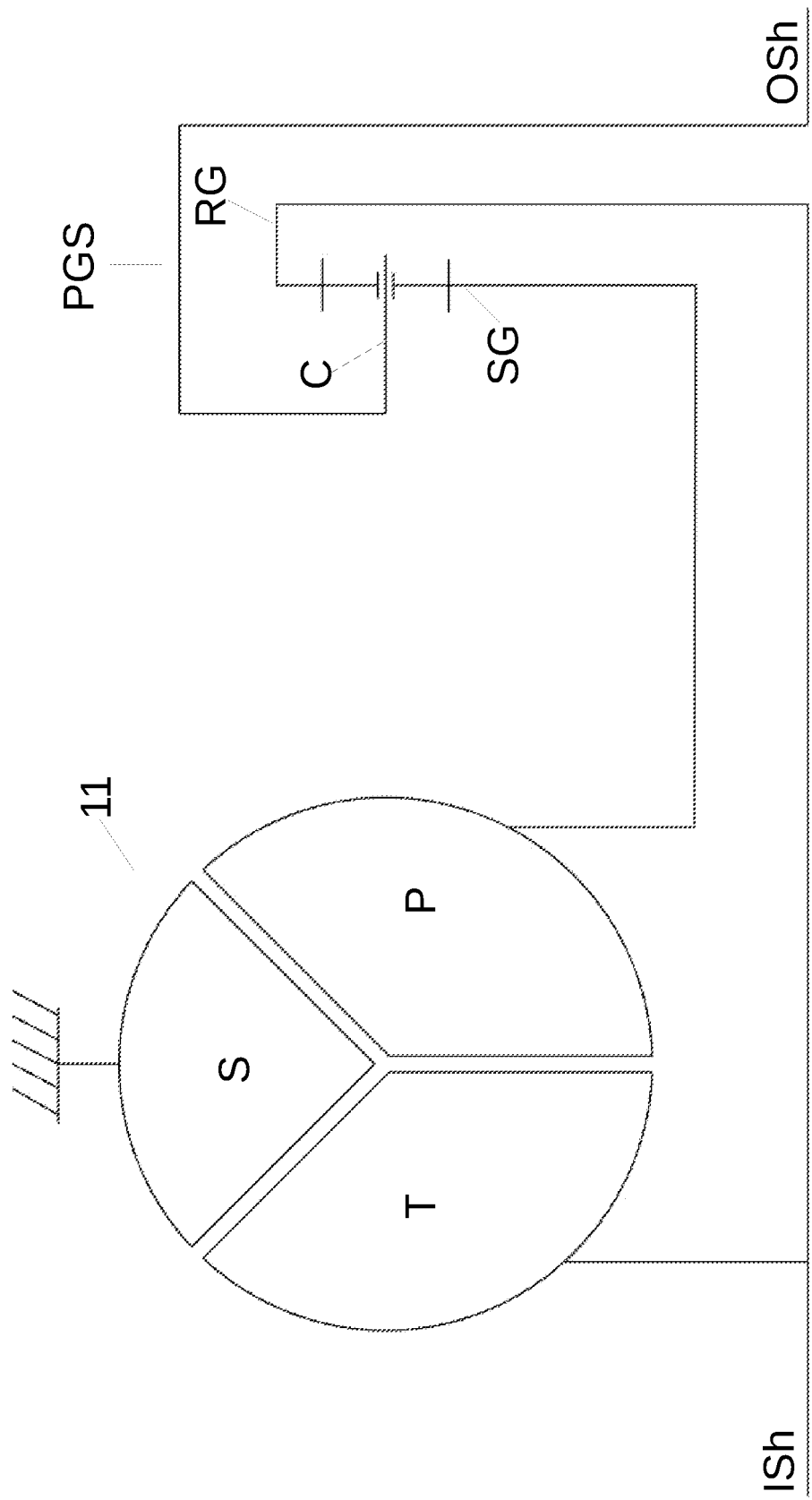

CONTINUOUSLY VARIABLE HYDRO-MECHANICAL TRANSMISSION

TECHNICAL FIELD OF THE INVENTION

The present invention pertains to the field of gears and transmissions, and more specifically to split power continuously variable hydrodynamic-mechanical transmissions, and its principal concern is to radically increase the range of variation of the transmission ratio of hydrodynamic torque converter (or the torque ratio spread), thus eliminating the need for augmenting torque converter by multi-stage mechanical gears and substantially simplifying transmission structure, and at the same time to substantially increase the maximum torque ratio and rate of growth of the output torque thus eliminating the need for use of separate final drives as a component of the drivetrain. The invention is a further development of my earlier invention Split Power Hydro-mechanical Transmission with Power Circulation (U.S. patent application Ser. No. 16/699,570).

STATE OF THE ART AND BACKGROUND OF THE INVENTION

Known "elementary" continuously variable hydrodynamic-mechanical transmissions, composed of hydrodynamic torque converter and single planetary gear, divides out naturally into two types: Hydrodynamic-mechanical transmissions with input planetary gear, and hydrodynamic-mechanical transmissions with output planetary gear. Typical transmission of the first type includes planetary gear and hydrodynamic torque converter, wherein the gear input (driving) shaft is connected with one member of the planetary gear (e.g. planet carrier), the hydrodynamic torque converter impeller is connected with another member of the planetary gear (e.g. sun gear), and the hydrodynamic torque converter turbine rotor is connected with yet another member of the planetary gear (e.g. ring gear) and output shaft. Typical transmission of the second type includes planetary gear and hydrodynamic torque converter, wherein the gear output (driven) shaft is connected with one member of the planetary gear (e.g. planet carrier), the hydrodynamic torque converter turbine rotor is connected with another member of the planetary gear (e.g. ring gear), and the hydrodynamic torque converter impeller rotor is connected with yet another member of the planetary gear (e.g. sun gear) and input shaft.

Such composition of the transmission causes the input torque and power delivered to the transmission is divided between two paths, namely the hydrodynamic path, where the driving torque is being continuously changed, and the purely mechanical path, the efficiency of which is larger than that of the hydrodynamic path. Thanks to such composition, overall efficiency of the transmission is larger than that of the torque converter, but the range of the transmission ratio change is similar to the range of the transmission ratio change of the torque converter. A drawback of this construction is that the maximum torque ratio and rate of rise of the torque ratio are diminished in comparison with torque converter itself. Moreover, range of change of the transmission ratio is typically 1:1-2:1 to 1:1-2.6:1. Kinetic schemes of such "elementary" hydrodynamic-mechanical transmissions are shown in FIGS. 1A-1L.

In order to extend the range of variation of the output torque (which is necessary for most applications) torque converter is usually combined in a single transmission with several (3-5) planetary gears through a number of brakes and clutches (in automatic transmissions). Such transmissions are extensively mechanically complicated, and require separate steering systems and hydrostatic gears changing device, which renders them even more complex; moreover, these transmissions are heavy and prone to defects, and costly.

All transmissions, known from the prior art, using torque converter feature good but not excellent rate of output torque rise, and an improvement of this parameter would be precious for emergency, military, and sport vehicles.

My earlier invention (Split Power Hydro-mechanical Transmission with Power Circulation; U.S. patent application Ser. No. 16/699,570) gives a method for increasing torque converter's torque ratio range of variation as well as the rate of rise of torque ratio; the method consists in introducing strong positive feedback between turbine and pump rotors of the torque converter by joining the turbine rotor directly with the input shaft, and by causing the turbine rotor propels the pump rotor via a planetary gear. Such a composition of the transmission enables to increase the torque ratio spread of the torque converter e.g. from 1.1:1-3:1 to 2:1-29:1, and to obtain a transmission with naturally continuously variable torque ratio within indicated limits, which also offers rapid increase of torque ratio at stall, and thus good vehicle acceleration. However, this torque ratio range of variation is not sufficient for some applications, e.g. for farm tractors or tactical vehicles (where the range of torque ratio variation as large as x-20x is deemed necessary). Moreover, further increase of the rate of rise of torque ratio, and therefore increase of vehicle acceleration, would be valuable for emergency, military and sport vehicles, and further increase of rate of driving torque at stall would be valuable for heavy working machines like dozers and loaders.

Thus there is a need for a simple and inexpensive continuously variable transmission capable of rapidly rising output torque, possessing very wide range of variation of output torque, and capable of self-regulating, suitable for wide range of vehicles and working machines subjected during operation to rapidly changing large loads.

SUMMARY OF THE INVENTION

Thus the principal objective of the present invention is to provide a simple continuously variable transmission with very large range of variation of the output torque, which offers large maximum torque ratio rapidly rising when the speed ratio approaches zero, suitable for various vehicles, particularly those destined for start-stop mode of operation, and working machines subjected to heavy loads rapidly varying within broad limits, like passenger cars, city buses, small earth moving machines (e.g. compact track multi-terrain loaders), trucks, off-road vehicles, backhoe loaders, large wheel and track loaders (in which rapidly growing output torque translates to rapidly growing breakout force), dozers, and first of all special purpose vehicles like emergency, military (e.g. tanks), and sport ones (dragsters), where good acceleration is of the highest priority.

These and other objectives are achieved according to the present invention by providing a hydrodynamic-mechanical transmission including a torque converter and an eccentric gear set, and systematically utilizing power circulation (present in all transmissions using hydrodynamic torque converter). The exceptionally intense power circulation is attained according to the present invention by introducing a strong positive feedback between the torque converter pump and turbine as well as between the pump and turbine rotors and members of an eccentric gear set, which, in turn, is achieved by way of a specific combination of hydrodynamic torque converter and eccentric gear set, as described in full detail hereinafter. The range of variation of the transmission ratio of the transmission according to the instant invention (using standard torque converters) is expected to extend from 2:1 to 80:1 and even more, depending on the torque converter and the eccentric gear set used, thus eliminating the need for applying multi-stage mechanical gears. Moreover, large maximum torque achieved by the transmission according to the present invention renders separate final drives unnecessary, thus further simplifying the driveline. From the theoretical point of view, the principal innovation of the present invention in comparison with that provided by U.S. patent application Ser. No. 16/699,570, is the introduction of a continuous parameter (eccentricity of an auxiliary eccentric of the eccentric gear set—see the detailed description below) to equilibrium equations of the transmission (in addition to discrete parameters, like transmission ratio of the gear), which offers much greater freedom of choosing solution of the equations.

BRIEF DESCRIPTION OF THE DRAWINGS

FIGS. 1A-1L show kinetic schemes of known "elementary" hydrodynamic transmissions being combinations of torque converter and planetary gear (prior art);

FIG. 2 shows schematically a transmission of the previous U.S. patent application Ser. No. 16/699,570;

Like symbols denote like transmission elements throughout all the drawings, where:

Figure 1A:
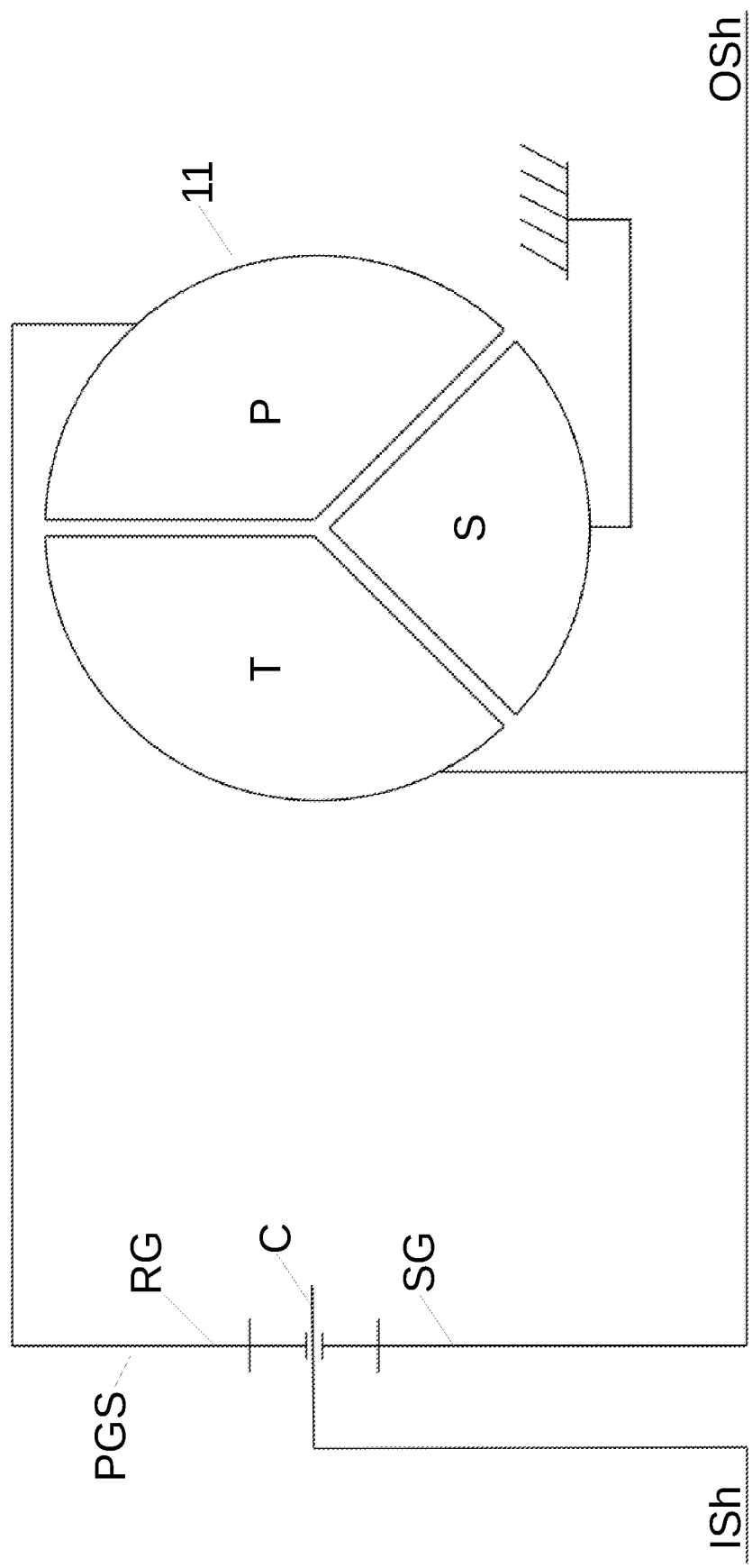
Figure 1B:
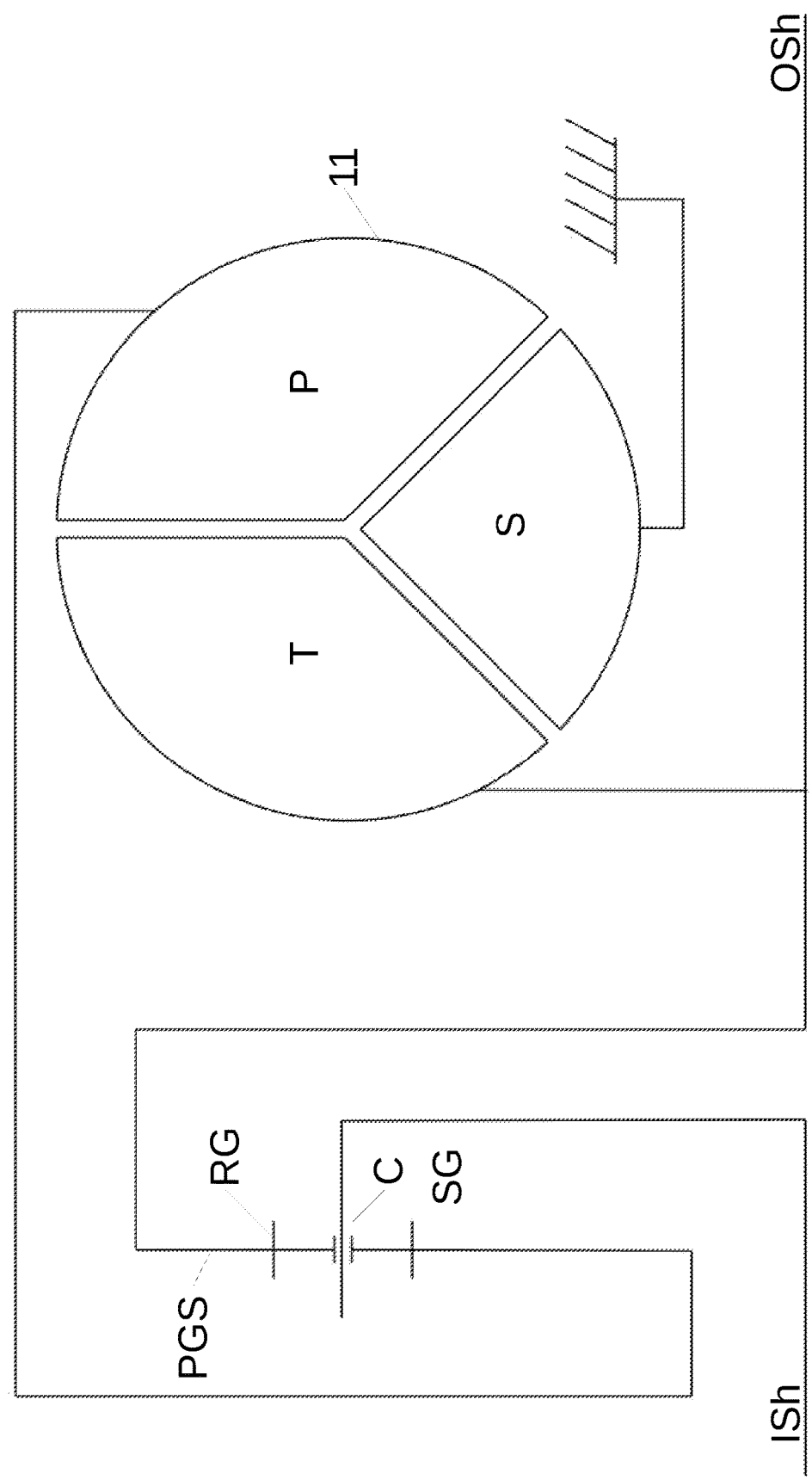
Figure 1C:
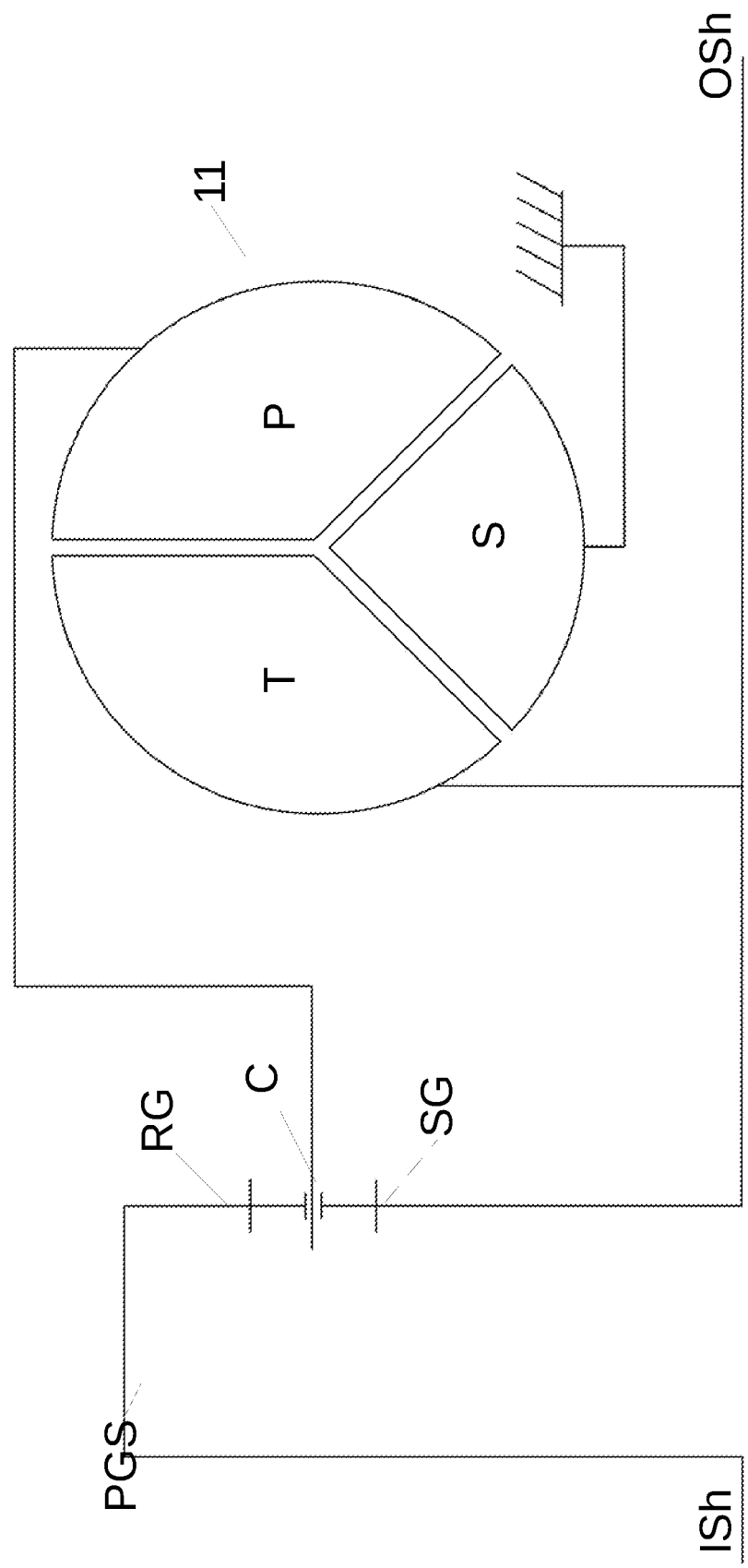
Figure 1D:
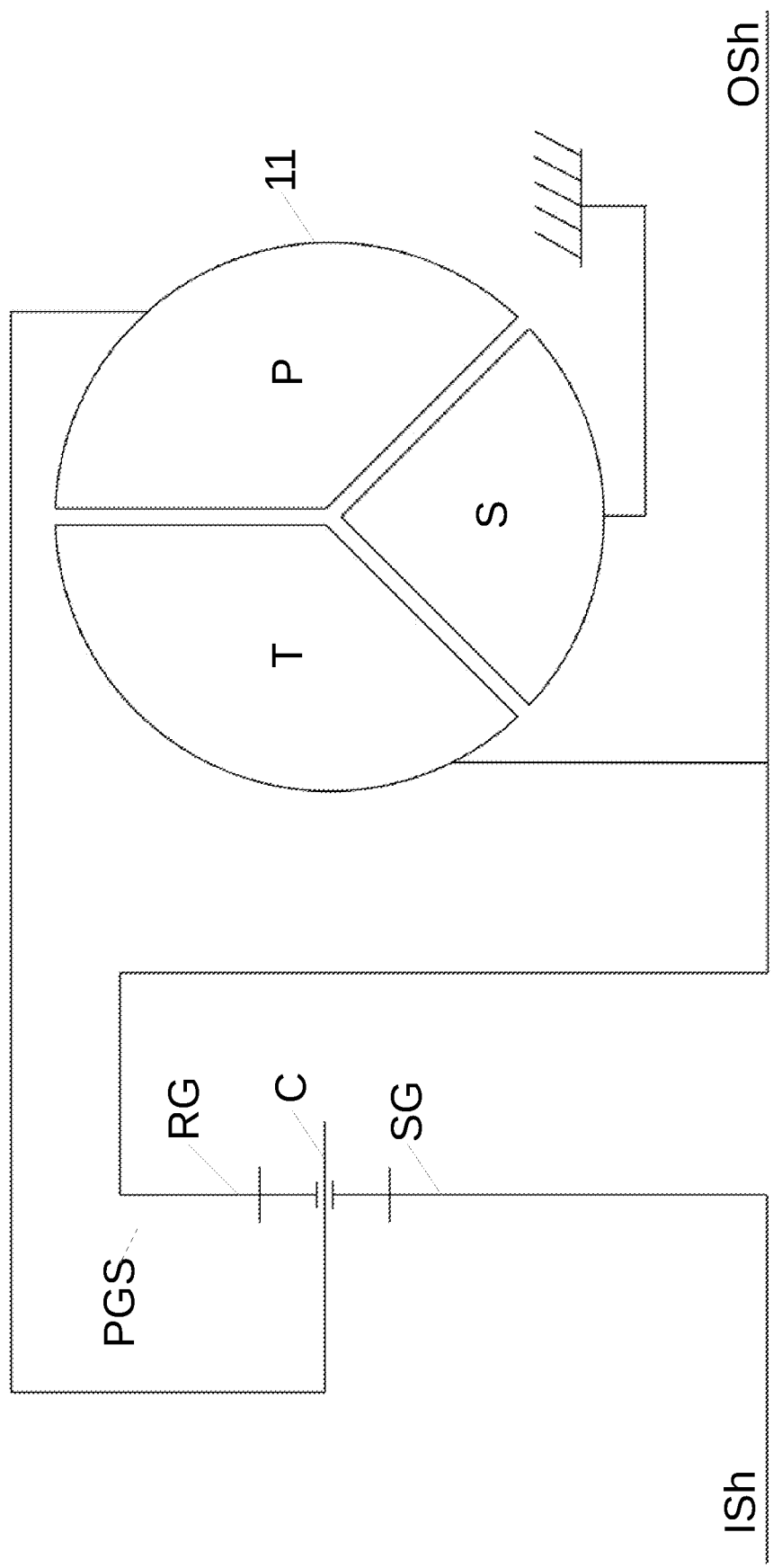
Figure 1E:
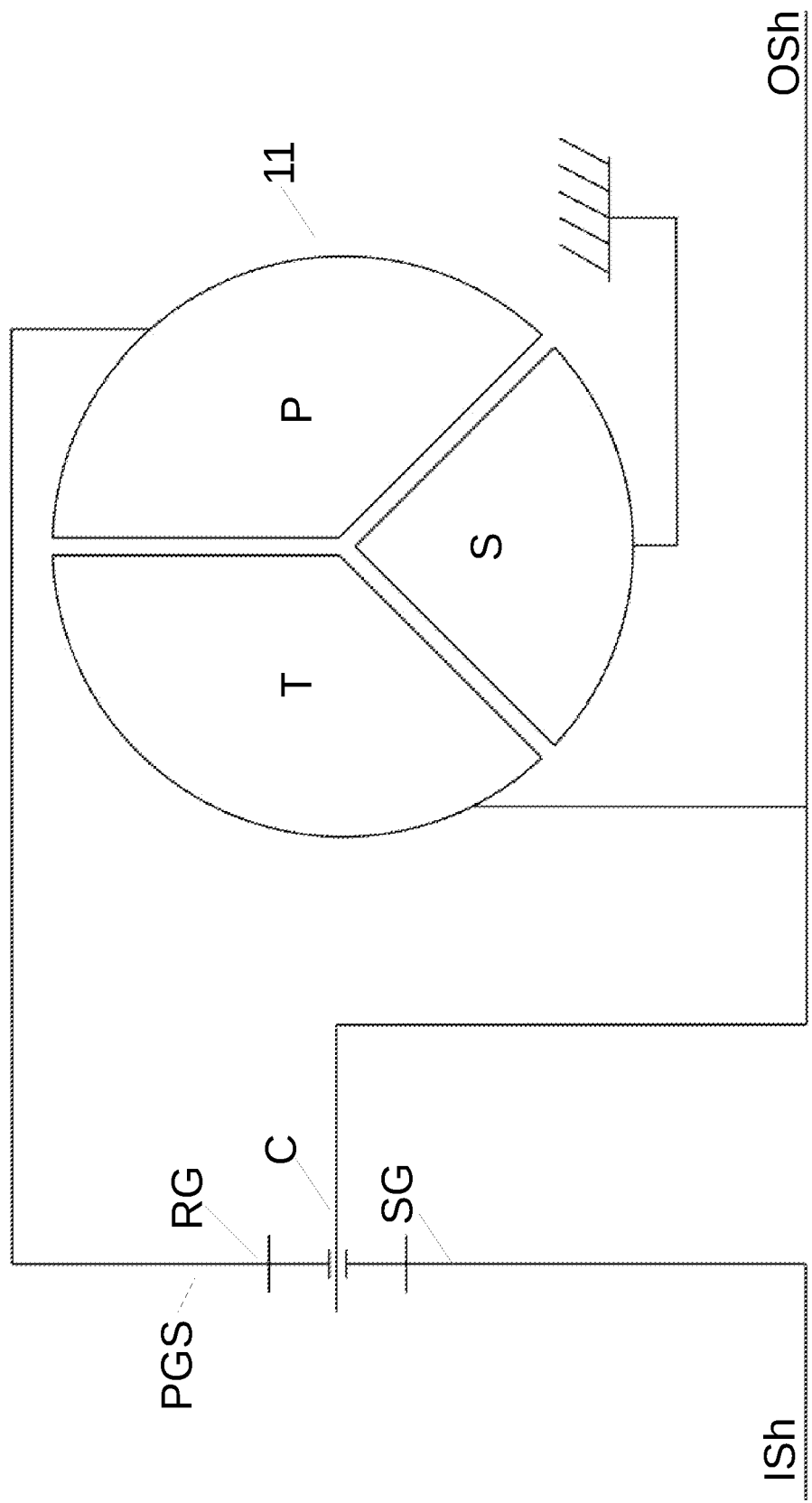
Figure 1F:
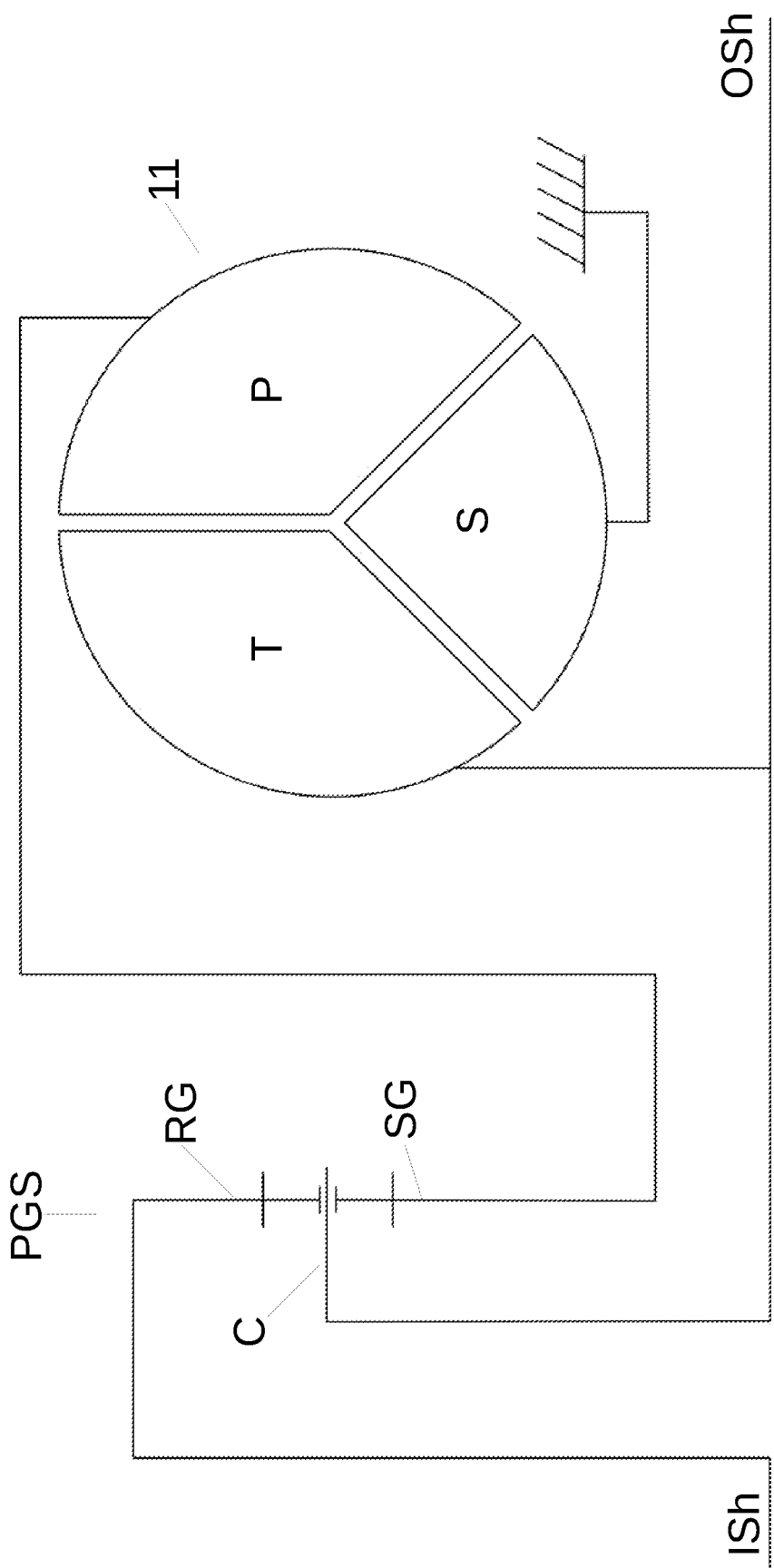
Figure 1G:
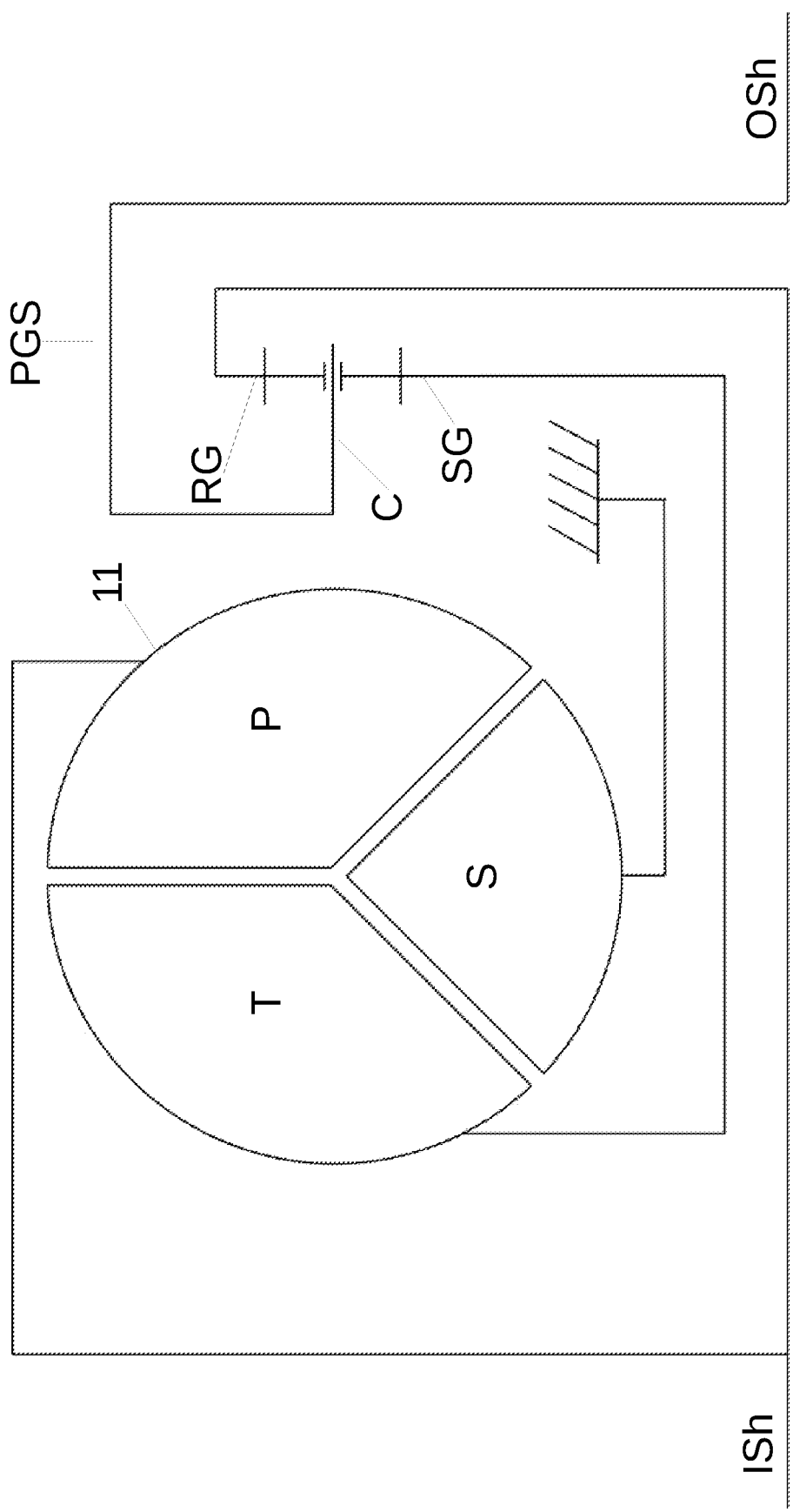
Figure 1H:
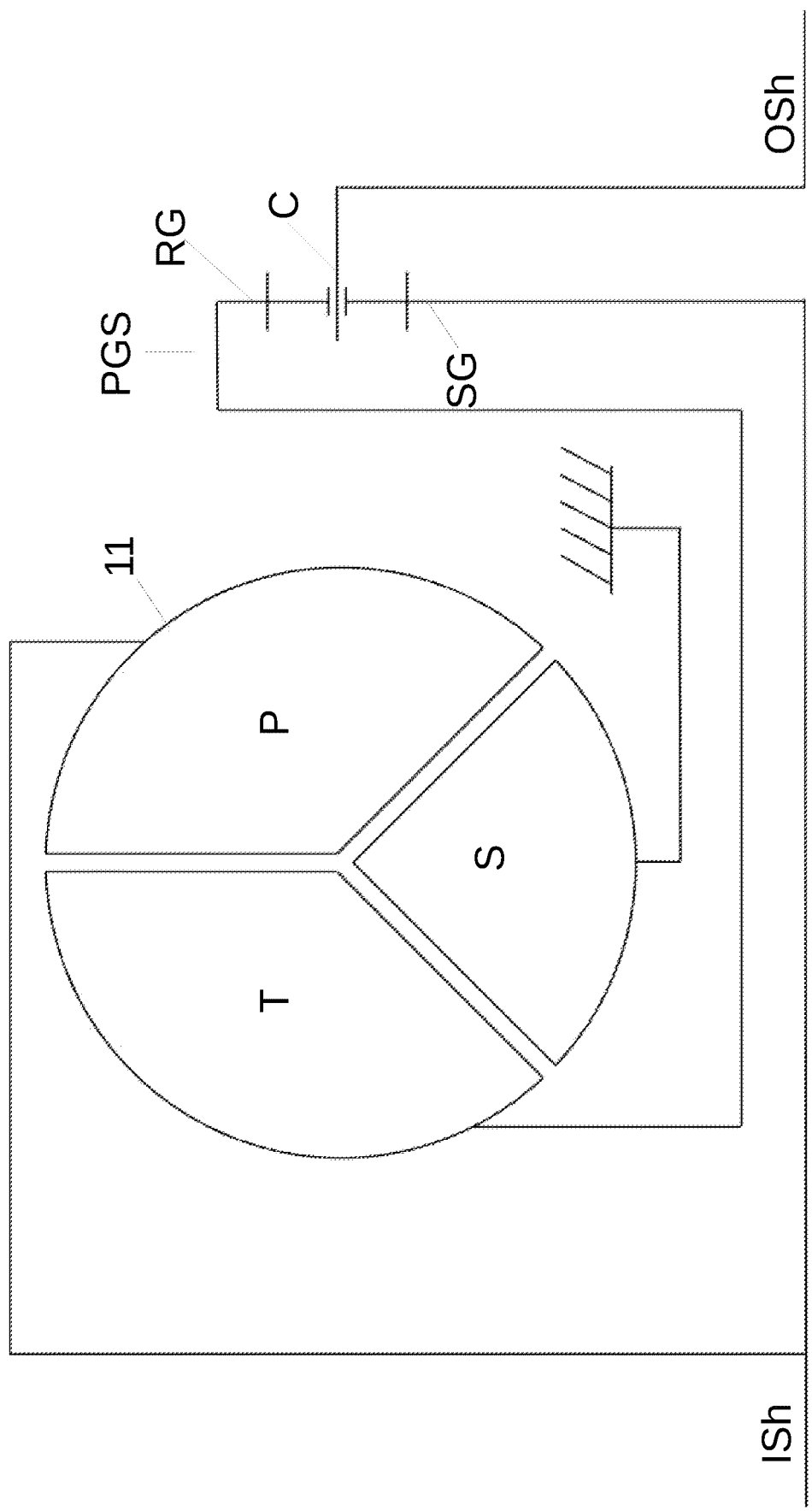
Figure 1I:
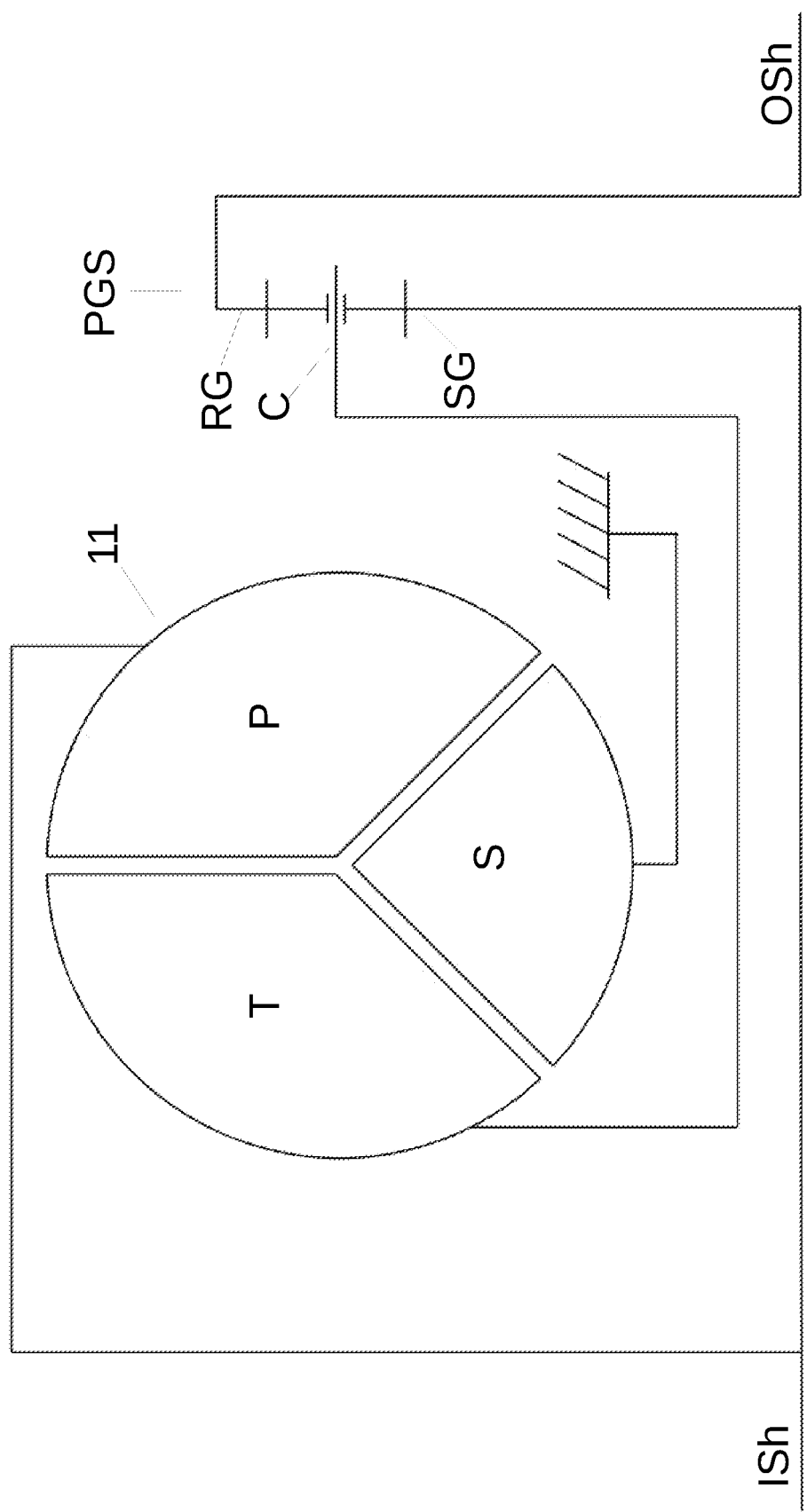
Figure 1J:
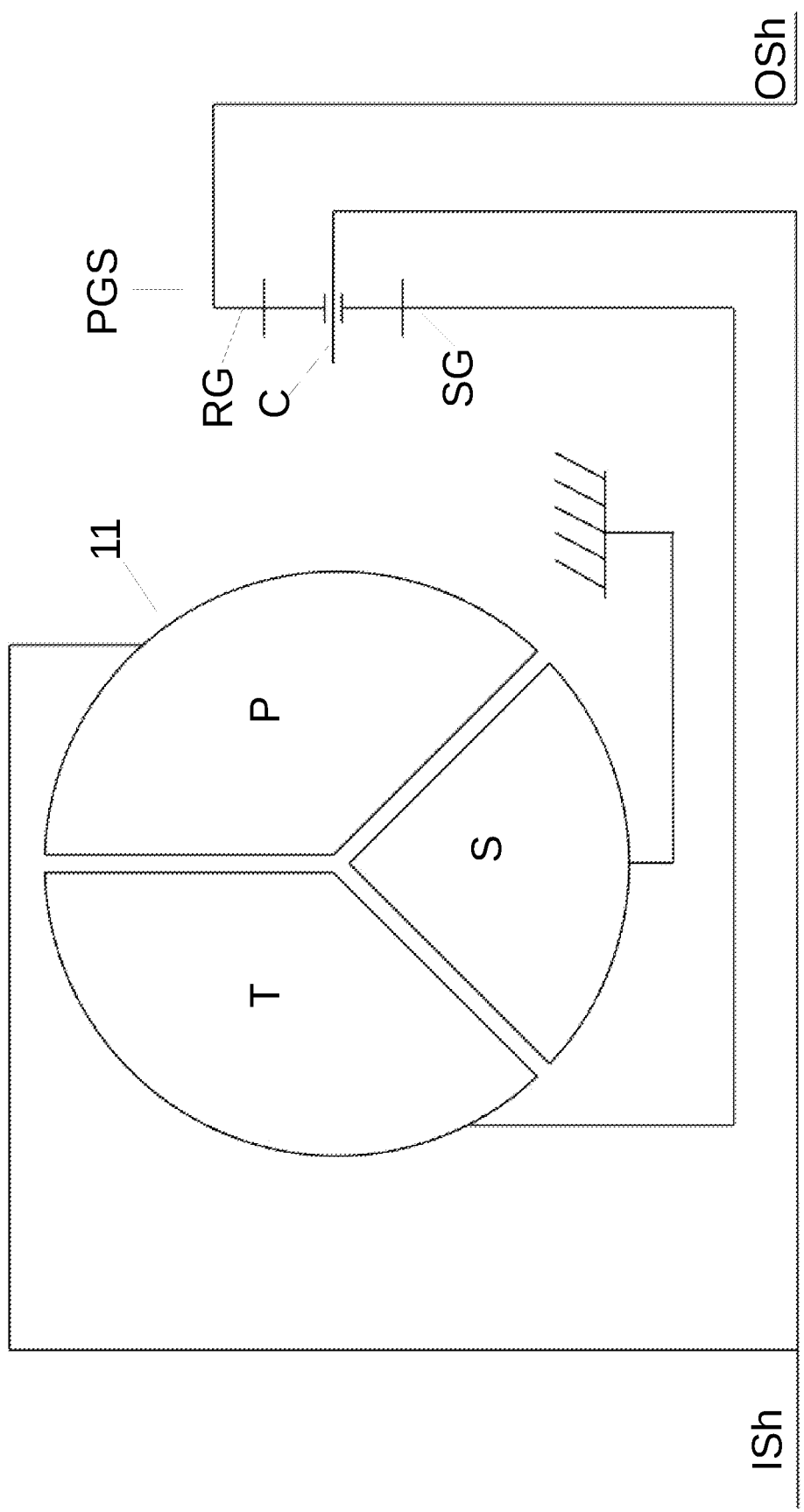
Figure 1K:
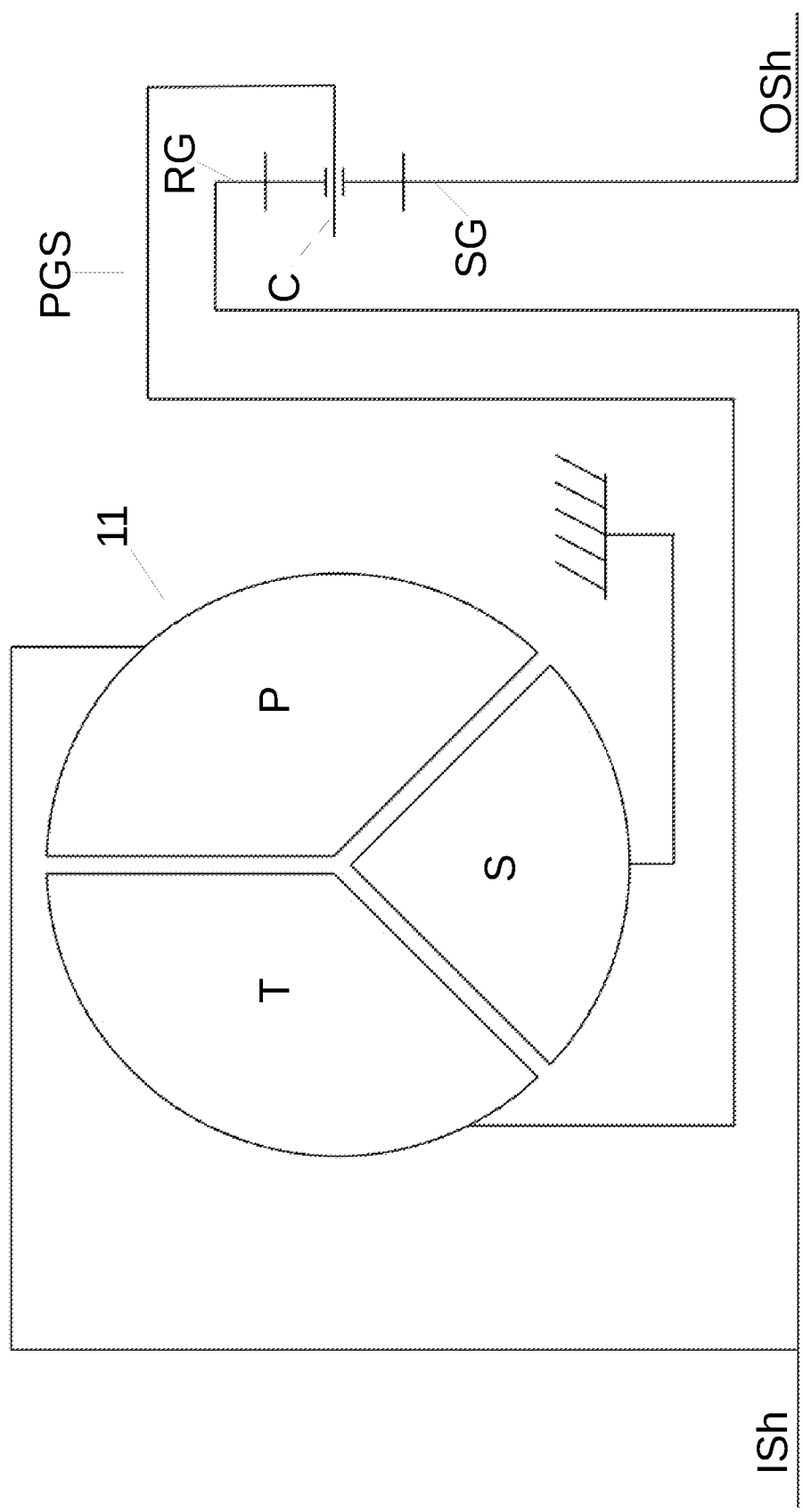
Figure 1I:
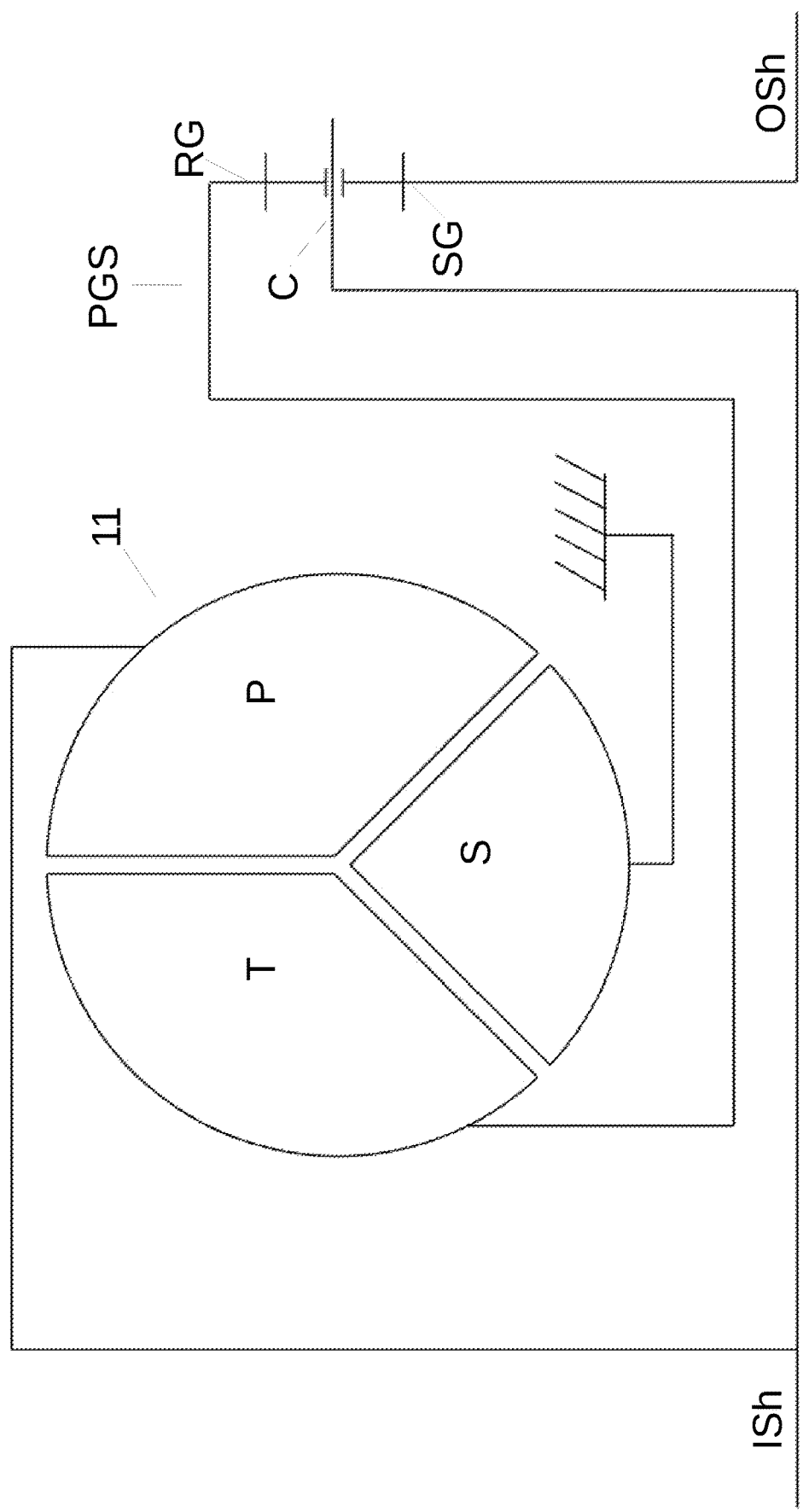

Numeral 10 refers generally to the transmission of the instant invention;
numeral 11 refers generally to the torque converter;
letter "T" refers generally to the torque converter turbine;
letter "P" refers generally to the torque converter pump or impeller;
letter "S" refers generally to the torque converter stator;
numeral 12 refers generally to the eccentric gear set;
letter "E" refers to the main eccentric of the eccentric gear set;
symbol "BE" refers to the bearing supporting the main eccentric of the eccentric gear set in the main gear;
letter "e" refers to the eccentricity of the main eccentric of the eccentric gear set;

symbol "Ea" refers to the first auxiliary eccentric of the eccentric gear set;
symbol "ea" refers to the eccentricity of the first auxiliary eccentric of the eccentric gear;
symbol "Eb" refers to the second auxiliary eccentric of the eccentric gear set;
symbol "BEb" refers to the bearing supporting the second auxiliary eccentric of the eccentric gear set in the transmission body;
symbol "eb" refers to the eccentricity of the second auxiliary eccentric of the eccentric gear;
symbol "Ec" refers to the third auxiliary eccentric of the eccentric gear set;
symbol "BEc" refers to the bearing supporting the third auxiliary eccentric of the eccentric gear set in the transmission body;
symbol "PG" refers to the planet gear of the eccentric gear set;
symbols "G", "$G_1$", "$G_2$", "$G_3$", "$G_4$" refer to the main gears of the eccentric gear set;
symbol "ISh" refers to the transmission input shaft;
symbol "BISh" refers to the bearing of the transmission input shaft;
symbol "OSh" refers to the transmission output shaft;
symbol "BOSh" refers to the bearing of the transmission output shaft;
symbol "D" refers to the disc mounted on the planet gear shaft;
symbol "Ei" refers to eccentrics joining the disc on the planet gear with the torque converter's pump;
symbol "Ej" refers to eccentrics joining the auxiliary or eccentric gear set with the transmission body;
symbol "ShPG" refers to the shaft of the planet gear;
symbol "BPGe" refers to the bearing supporting the planet gear shaft in the main eccentric;
symbol "BPGa" refers to the bearing supporting the planet gear shaft in the first auxiliary eccentric;
symbol "BPGc" refers to the bearing supporting the planet gear shaft in the third auxiliary eccentric;
symbol "ShG" refers to the shaft of the main gear of the eccentric gear set;
symbol "BEb" refers to the bearing supporting the second auxiliary eccentric in the transmission's body;
symbol "BShG" refers to the bearing supporting the shaft of the main gear in the second auxiliary eccentric;
symbol "UJ" refers generally to universal joints;
symbol "Ga" refers generally to auxiliary gear sets;
symbols "Sp1", "Sp2" refer to spline joints;
symbol "PGE" refers to planetary gear set;
symbol "RG" refers to ring gear;
symbol "SG" refers to sun gear;
symbol "C" refers to planet carrier.

DETAILED DESCRIPTION OF PREFERRED EMBODIMENTS

First Embodiment (FIGS. 3, 3a, 4, 5)

Figure 3:
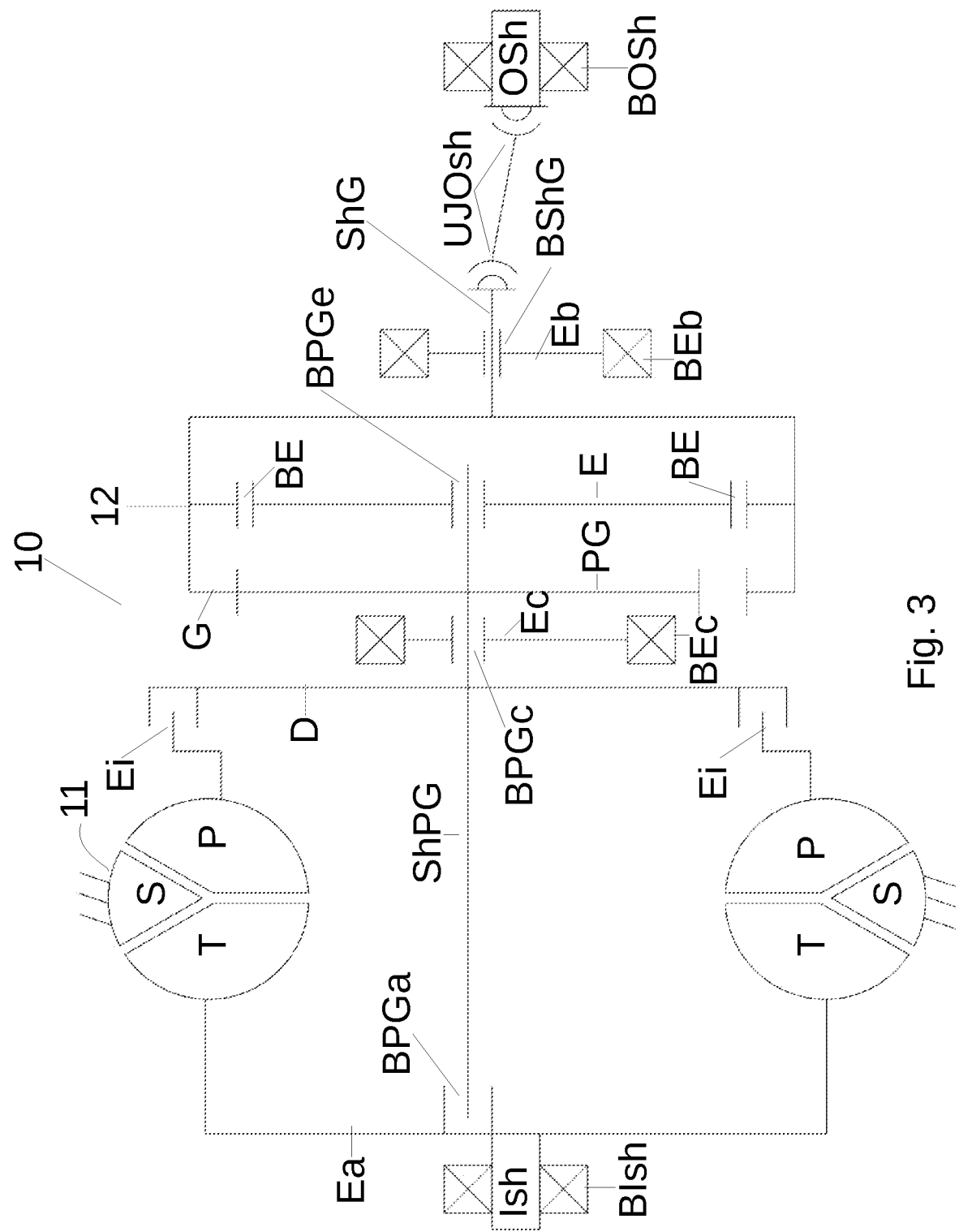
FIG. 3 shows schematically a first version of a first preferred embodiment of the invention, wherein the transmission includes a torque converter and an eccentric gear set equipped with spur gears, having an externally toothed planet gear, wherein the transmission input shaft is connected directly to the torque converter turbine and an auxiliary eccentric of the eccentric gear set, the pump is connected to the planet gear of the eccentric gear set, and the output shaft is connected to the ring gear of the eccentric gear set.

A. First version (FIG. 3). Transmission according to the present invention 10 includes a speed-multiplication torque converter 11 (with turbine and impeller rotors rotating in mutually opposite directions; wherein the turbine rotor rotates faster than the pump rotor; wherein the turbine is preferably of the axial, type), and a typical eccentric gear set 12 including a main (ring) internally toothed gear G having a first radius r (expressed in units of the teeth's normal module), an externally toothed planet gear PG having a second radius r1 (expressed in units of the teeth's normal module), and a main eccentric E supported for rotation relative the main gear G in the bearing BE, wherein the planet gear's PG shaft ShPG is supported for rotation relative the main eccentric E, resp. the first auxiliary eccentric Ea, resp. the third auxiliary eccentric Ec, with the help of the bearing BPGe, resp. BPGa, resp BPGc; wherein the main eccentric keeps the main gear and the planet gear in permanent meshing. The transmission's input shaft ISh is connected rigidly to the torque converter's 11 turbine rotor T through a first auxiliary eccentric Ea; the transmission's output shaft OSh is connected with the main gear G of the eccentric gear set through a universal joint UJOsh and the main gear's G shaft ShG, and the torque converter's impeller rotor P is connected with the planet gear PG through a disc D mounted rigidly on the planet gear's PG shaft ShPG, and a number of eccentrics Ei, which prevents the planet gear PG from rotating relative the impeller's rotor P while enabling the planet gear PG to execute orbiting movement relative the impeller P. The input shaft Ish is supported for rotation relative the transmission's 10 body in a bearing BIsh. The output shaft Osh is supported for rotation relative the transmission's 10 body in a bearing BOsh. A second auxiliary eccentric Eb is supported for rotation relative the transmission's body in a bearing BEb. The main gear's G shaft ShG is supported for rotation relative the second auxiliary eccentric Eb in the bearing BShG. The eccentricity of the main eccentric E equals e=r−r1>0; the eccentricity of the first auxiliary eccentric Ea equals ea≥e; the eccentricity of the second auxiliary eccentric Eb equals eb¿e−ea, and the eccentricity of the eccentrics Ei equals ea.

The transmission's input shaft ISh is connected with shaft of a prime mover, typically an internal combustion engine (not shown).

It is to be stressed that connecting the torque converter's turbine rotor to the transmission's input shaft does not make it an impeller rotor: The rotor still extracts energy from a fluid flow (directed inwardly, like in radial turbine rotor of any torque converter), and converts it into energy of the rotor, thus adding the power and torque generated by the fluid flow to the power and torque delivered by a prime mover; moreover this rotor distinguishes from an impeller rotor by hydrofoil profile, and specific placement of the hydrofoil profile relative the hydrofoil profile of the torque converter's stator (rounded (leading) edges of blades of the turbine rotor are placed at external (largest) circumference of the rotor, while sharp (trailing) edges of blades are placed in proximity to the rotor's axis of rotation; in contrast, rounded (leading) edges of blades of radial impeller rotor are always placed in proximity to the rotor's axis of rotation, while sharp (trailing) edges of blades are placed at external (largest) circumference of the impeller rotor).

The torque converter of the transmission, according to the presented invention, must be large enough to absorb relatively large circulating power, and to allow to generate large output torque. To be more precise, the torque converter 11 of the transmission according to the instant invention destined for mating with a prime mover having maximum power PP and maximum output torque PT has nominal maximum input power lPP being a multiple of the maximum prime mover's power PP by a factor of l (where typically l∈[8; 20]), and nominal maximum input torque kPT being a multiple of the maximum prime mover's output torque PP by a factor of k (where typically k∈[8; 20]).

Now a discussion of the operation (at equilibrium states) of the transmission follows; this discussion applies, with only minor changes, to all the embodiments of the instant invention described hereinbelow.

Let PS(t) be the output power of the prime mover at the moment t, $P_c(t)$—the circulating power at the moment t, $P_o(t)$—the power on the transmission output shaft OSh, TS(t)—torque delivered by the prime mover at the moment t, $T_t(t)$—torque on the turbine rotor T at the moment t, $T_{r1}(t)=TS(t)+T_t(t)$—the resultant torque on the transmission input shaft ISh at the moment t, $T_p(t)$—torque on the impeller rotor P at the moment t, $T_{PG}(t)$—torque on the planet gear PG at the moment t, $F_2(t)$—force exerted on the planet gear PG by the main gear G at the moment t, r—distance between the point of application of force $F_2(t)$ and the axis of rotation of the main gear G (coinciding with the axis of symmetry of the shaft ShG), $r_1$—distance between the point of application of force $F_2(t)$ and the axis of rotation of the planet gear PG around its own (movable) axis of rotation (coinciding with the axis of symmetry of the shaft ShPG; wherein both the distances r and $r_1$ are expressed in units of the normal module of teeth of the gears PG and G; thus $$\frac{r_1}{r} = \frac{z_1}{z},$$

where z, resp. $z_1$ is the number of teeth on the gear G, resp. PG), $F_3(t)$—force exerted on the planet gear's PG shaft ShPG by the first auxiliary eccentric Ea at the moment t, $F_4(t)$—force exerted on the planet gear PG (through the disc D) by the "upper" eccentric Ei at the moment t, $F_5(t)$—force exerted on the planet gear PG (through the disc D) by the "lower" eccentric Ei at the moment t, $n_1(t)$—rotational velocity of the planet gear PG of rotation around its own (movable) axis of rotation at the moment t (equal to the rotational velocity of the torque converter's impeller P), $n_2(t)$—rotational velocity of the main gear G relative the transmission's body at the moment t (equal to the rotational velocity of the transmission's output shaft Osh), $n_3(t)$—rotational velocity of the first auxiliary eccentric Ea relative the transmission's body at the moment t (equal to the rotational velocity of the torque converter's turbine T and the transmission's input shaft ISh), $T_{r2}(t)$— the external torque on the transmission output shaft at the moment $$t, i_s(t) = \frac{n_1(t)}{n_3(t)}$$

is the torque converter speed ratio, $i_t(t)$ is the torque converter torque ratio, $\eta(i_s)=i_s(t)i_t(t)$ denotes the torque converter efficiency, $$i'_s(t) = \frac{n_2(t)}{n_3(t)}$$

is the transmission speed ratio, $i_t'(t)$ is the transmission torque ratio, $\eta'(i_s')=i_s'(t)i_t'(t)$ denotes the overall transmission efficiency. I assume that $F_4(t)=-F_5(t)$, which can be assured by applying any known forces equalizer. Then, during operation of the gear the following equations hold at equilibrium states:

1 $T_{r1}(t)=TS(t)+T_t(t)$ (principal equations characterizing transmission according to the present invention: the resultant torque on the transmission input shaft is the sum of the torque on the prime mover shaft and the torque on the turbine rotor);

2. $T_{r1}(t)-e_aF_3(t)=0$ (equilibrium of the first auxiliary eccentric Ea);
3. $r_1F_2+T_p(t)=0, F_2+F_3=0$ (equilibrium of the planet gear PG);
4. $-rF_2+T_{r2}(t)=0$ (equilibrium of the ring gear G);
5. $T_t(t)=i_t(t)T_p(t)$ (where $i_t(t)>0$, since the turbine and the impeller rotors rotate in mutually inverse directions);

6. $n_1(t_1) = \frac{r}{r_1}n_2(t_1) + \left(1 - \frac{r}{r_1}\right)n_3(t_1);$

7. $\eta(i_s)=i_s i_t;$
8. $\eta'(i_s')=i_t' i_s';$

9. $T_p(t) = \frac{1}{\frac{e_a}{r_1} - i_t(t)} TS(t);$

10. $T_{r2}(t) = \frac{r}{r_1 i_t(t) - e_a} TS(t)$

11. $\eta'(t) = -\left(\frac{r_1}{r}\left(\frac{1}{i_s} - 1\right) + 1\right)\frac{r}{r_1 i_t(t) - e_a}.$ The transmission according to the instant invention features strong positive feedback between the rotors of pump and turbine, which translates to exceptionally large torque at stall and exceptionally large range of torque ratio variation: Since the turbine is connected directly to the transmission's input shaft (connected to shaft of a prime mover), the fluid pumped by the pump, after its angular momentum is changed by the torque converter's stator, enters the turbine rotor, and generates torque and power that add to the torque and power delivered by a prime mover; then the turbine drives the pump with greater power and torque, the pump generates the fluid flow of greater power and angular momentum, which, when enters the turbine rotor, generates still larger power and torque on the transmission's input shaft, and so on ad infinitum; this is the phenomenon of power circulation; had the torque converter's efficiency be equal to 1 this positive feedback loop would be unfading, thus causing the circulating power and torque on the output shaft rise to infinity; since the torque converter's efficiency is smaller than 1, the feedback between the pump and turbine rotors fades, subsequent increments of power and torque added by the fluid to the total power and torque on the input shaft tends to zero, which results in finite torque and power on the transmission's input and output shafts.

Since the rotation speed of the turbine rotor equals the rotation speed of the prime mover shaft, this transmission operates at relatively large rotational speeds of the torque converter rotors.

Figure 17:
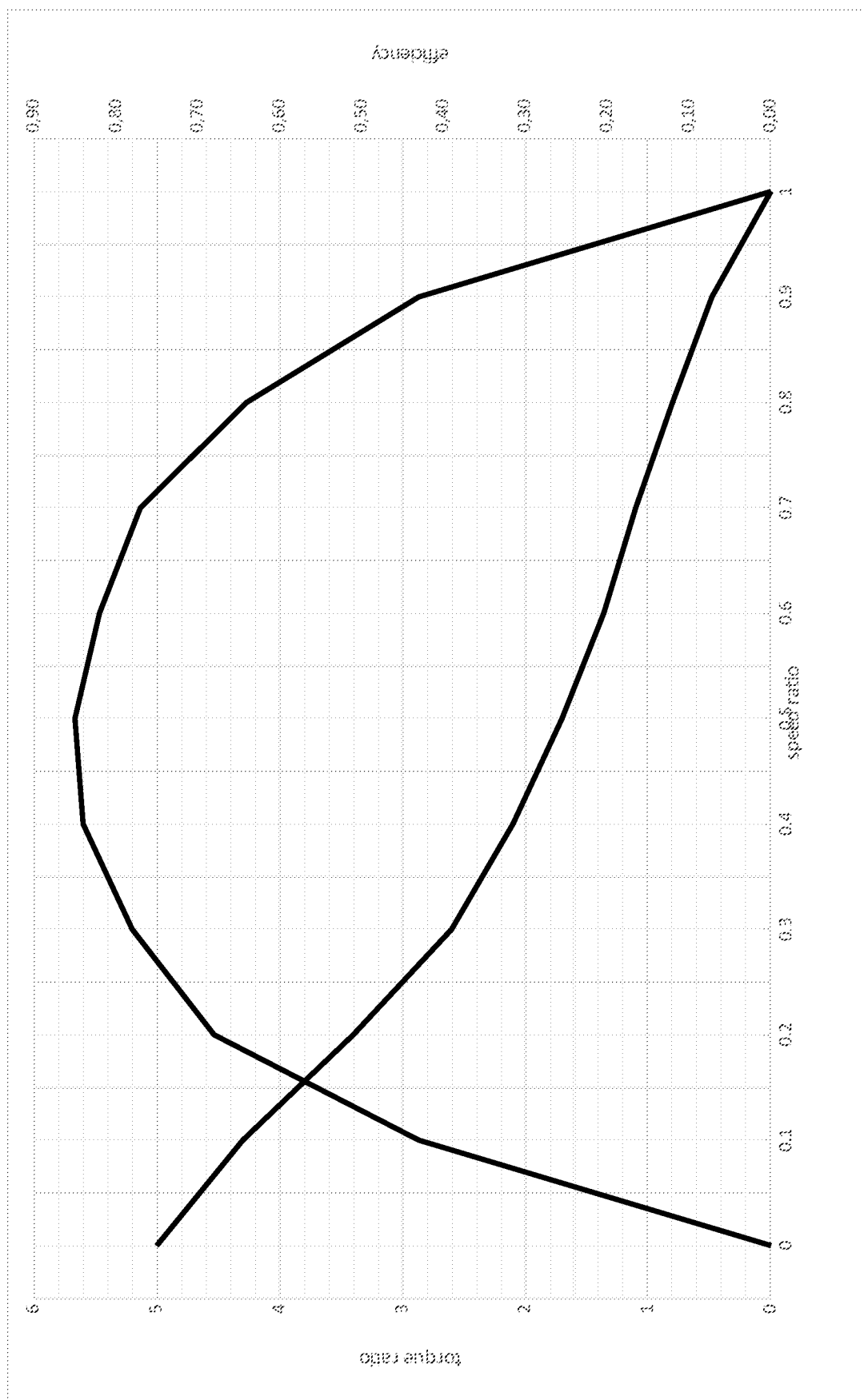
FIG. 17 shows the characteristics of an exemplary torque converter.
Figure 18:
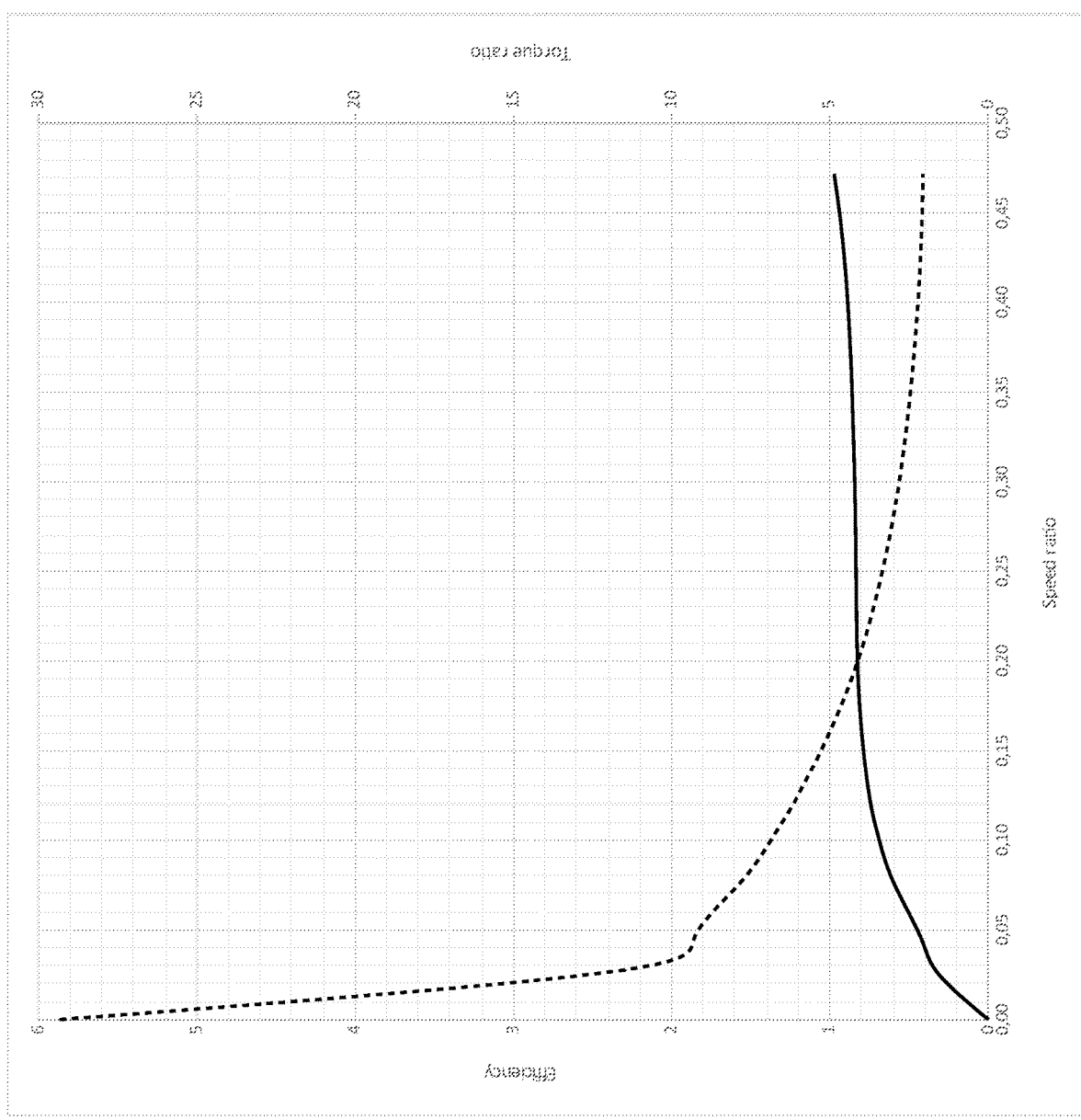
FIG. 18 shows the characteristics of a hypothetical speed-multiplying torque converter.

EXAMPLE 1. Assume that a hypothetical speed multiplication torque converter is used having the characteristics as shown in FIG. 18, prepared using characteristics of a conventional torque converter shown in FIG. 17 (a Twin Disc torque converter's characteristic, see Z. Szydelski, Hydrodynamic couplings, brakes and torque converters, Wydawnictwa Komunikacji I Łączności publishers, Warsaw, 1981 (in Polish) based on the following Conjecture/Hypothesis:

Conjecture/Hypothesis. The efficiency $n_m(i_s)$, resp. the torque ratio $i_m(i_s)$, of the speed-multiplying torque converter ($i_s \geq 1$), corresponding to the speed ratio $i_s$, equals $\eta\left(\frac{1}{i_s}\right),$ resp.

$i_t\left(\frac{1}{i_s}\right)$ (for $i_s \in [a, b]$ for certain values of a and b), where $\eta\left(\frac{1}{i_s}\right)$ is the efficiency of the conventional torque converter for the speed ratio $\frac{1}{i_s}$ (where the speed ratio is understood as the ratio of the rotational speed of turbine to the rotational speed of pump); thus the efficiency of the hypothetical speed-multiplication torque converter at the speed ratio $i_s \geq 1$, understood as the ratio of the rotational speed of the faster rotor (turbine) to the rotational speed of the slower rotor (pump), is assumed to be equal to the efficiency of the conventional torque converter at the same speed ratio $i_s \geq 1$ understood as the ratio of the rotational speed of the faster rotor (pump) to the rotational speed of the slower rotor (turbine); the factor $\theta(i_s) \approx 1$ was introduced to take account of slightly smaller efficiency of torque converters with counter rotating rotors in comparison with torque converters with rotors rotating in the same direction.

Let $r=12, r_1=9, e_a=e=r-r_1=3, \theta(i_s)=1$; then the following results are obtained: the transmission's output torque at stall $(n_2=0) T_{r2stall}=-20$ TS, and for $n_2=0.2$ $n_3$ $T_{r2} \approx -4.25$ TS, $\eta(0.15) \approx 0.85$. Since both the eccentricity ea of the first auxiliary eccentric Ea and the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb equals zero, and the ring gear G of the eccentric gear set executes purely rotational motion.

For $e_a=2.5$ and all the other parameters unchanged Equation 10 gives $T_{r2stall}=-120$ TS, and for $n_2=0.15$ $n_3$ $T_{r2} \approx -6.33$ TS, $\eta'(0.15) \approx 0.95$. Since the eccentricity ea of the first auxiliary eccentric Ea is not equal to the eccentricity $e=r-r_1=3$ of the main eccentric E, the eccentricity eb of the second auxiliary eccentric Eb is non-zero, and the ring gear G of the eccentric gear set executes compound rotational-orbiting motion relative the transmission's body. This transmission features exceptionally large torque ratio spread equal to [6.33; 120], which renders it useful for machines and vehicles subjected to loads varying within broad limits during operation process like e.g. for tactical vehicles.

Figure 3A:
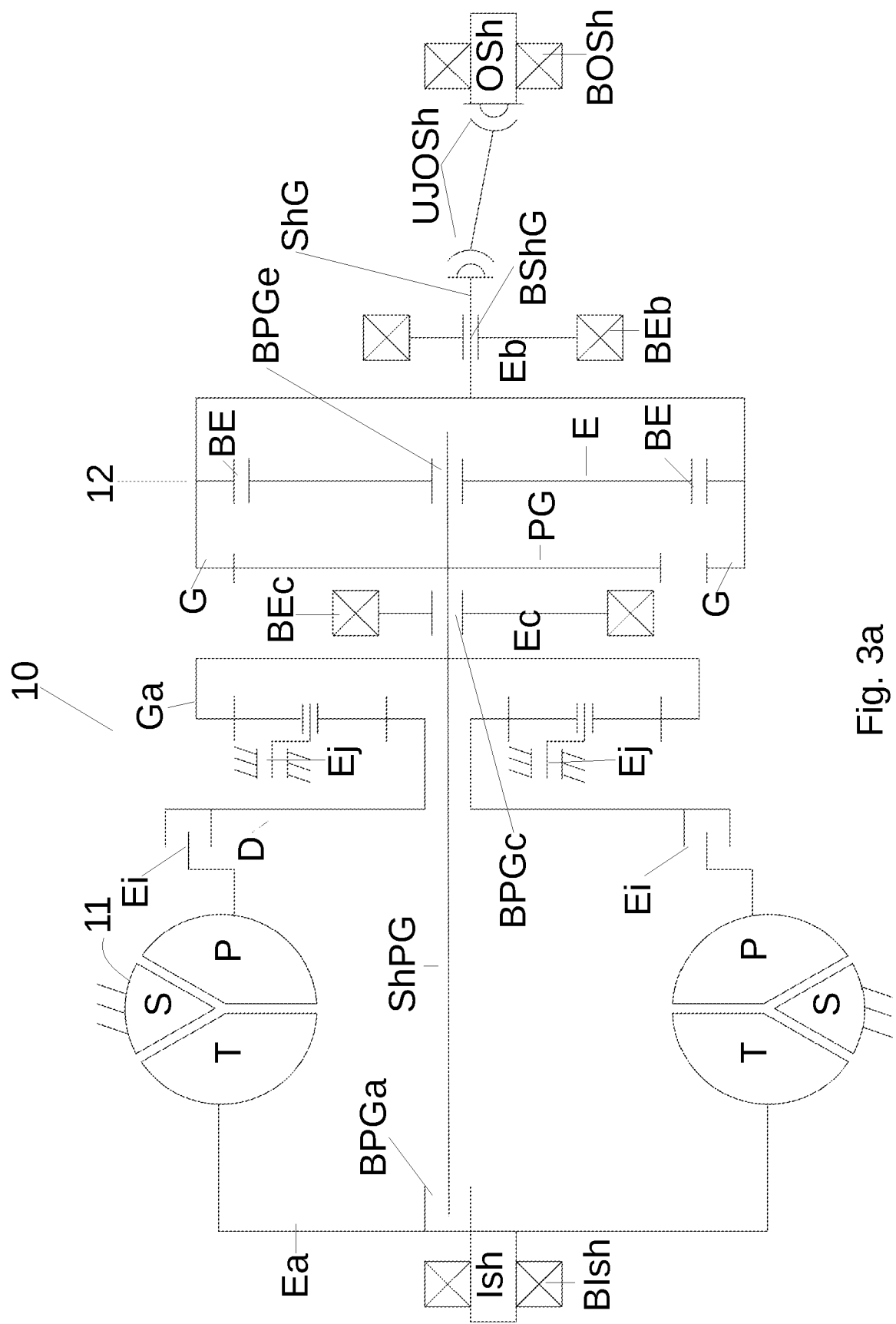
FIG. 3a shows schematically another form of the first version of the first preferred embodiment of the invention, wherein the transmission includes a torque converter and an eccentric gear set equipped with spur gears, having an externally toothed planet gear, wherein the transmission input shaft is connected directly to the torque converter turbine and an auxiliary eccentric of the eccentric gear set, the pump is connected to the planet gear of the eccentric gear set through a speed-multiplying direction of rotation reversing gear, and the output shaft is connected to the ring gear of the eccentric gear set.

FIG. 3a shows another form of the first preferred embodiment of the invention, which differs from that described immediately hereinabove only in that the impeller rotor P is connected with the planet gear PG through a speed-reducing, direction of rotation reversing gear Ga having kinematic transmission ratio ρ (assumed, for simplicity, to be equal to the dynamic transmission ratio); this allows for using a conventional speed-reducing torque converter with rotors rotating in the same direction; thus the description of the first form of the first embodiment of the invention applies also to this form of the first preferred embodiment of the invention. The speed-reducing auxiliary gear set Ga is mounted in the transmission's body with the help of a number of eccentrics Ej' that secures the gear Ga against rotation, while enabling it to execute orbiting motion relative the transmission's body.

During operation of the gear the following equations hold at equilibrium states (still assuming that $F_4(t)=-F_5(t)$):

12 $T_{r1}(t)=TS(t)+T_t(t)$ (principal equations characterizing transmission according to the present invention: the resultant torque on the transmission input shaft is the sum of the torque on the prime mover shaft and the torque on the turbine rotor);

13 $T_{r1}(t)-e_a F_3(t)=0$ (equilibrium of the first auxiliary eccentric Ea);

14 $r_1 F_2+\rho T_p(t)=0, F_2+F_3=0$ (equilibrium of the planet gear PG);

15 $-r\, F_2+T_{r2}(t)=0$ (equilibrium of the ring gear G);

16 $T_t(t)=-i_t(t)T_p(t)$ (where $i_t(t)<0$ if $\rho<0$);

Equations 12-16 immediately yield:

$$17\ T_p(t) = \frac{1}{\frac{e_a \rho}{r_1} - i_t(t)} TS(t);$$

$$18\ T_{r2}(t) = \frac{r\rho}{r_1 i_t(t) - e_a \rho} TS(t).$$

Example 2. For $r=10.5$, $r_1=9$, $e_a=e=r-r_1=1.5$, $\rho=-18$, the following results are obtained, assuming the Twin Disc torque converter is used, the characteristics of which is shown in FIG. 17, (see Z. Szydelski, Hydrodynamic couplings, brakes and torque converters, Wydawnictwa Komunikacji I Łączności publishers, Warsaw, 1981): the transmission's output torque at stall ($n_2=0$) $|T_{r2stall}|=|T_{r2}|_{max}\approx 52.5$ TS, and $|T_{r2}|_{min}\approx 5.25$ TS. Since both the eccentricity ea of the first auxiliary eccentric Ea and the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb equals zero, and the ring gear G of the eccentric gear set executes purely rotational motion. This transmission features mediocre torque ratio spread equal to [5.25; 52.5], which renders it useful for e.g. city buses and off-road trucks.

Figure 4:
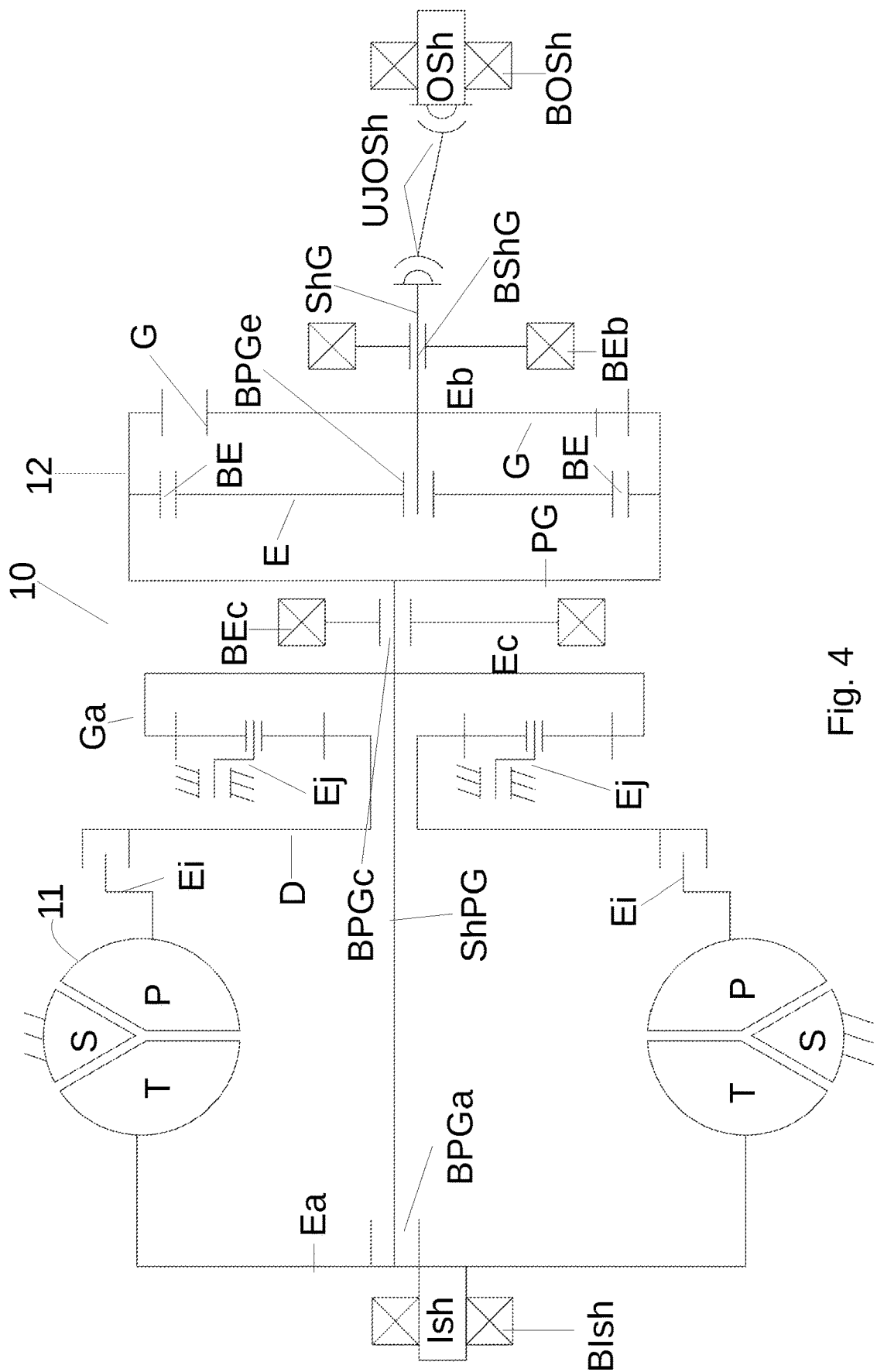
FIG. 4 shows schematically a second version of the first preferred embodiment of the invention, wherein the transmission includes a torque converter and an eccentric gear set equipped with spur gears, having an internally toothed planet gear and an externally toothed ring gear, wherein the transmission input shaft is connected directly to the torque converter turbine and an auxiliary eccentric of the eccentric gear set, the pump is connected to the planet gear of the eccentric gear set through a speed-multiplying direction of rotation reversing gear, and the output shaft is connected to the ring gear of the eccentric gear set.

B. Second version (FIG. 4). Transmission according to the present invention 10 includes a conventional torque-multiplying torque converter 11 with turbine and impeller rotors rotating in the same direction, and an eccentric gear set 12 including a main externally toothed main gear G having a first radius r (expressed in units of the teeth's normal module), an internally toothed (ring) planet gear PG having a second radius r1 (expressed in units of the teeth's normal module), and a main eccentric E supported for rotation relative the planet gear PG in the bearing BE; wherein the main eccentric keeps the main gear and the planet gear in permanent meshing; wherein the planet gear's PG shaft ShPG is supported for rotation relative the third auxiliary eccentric Ec, resp. the first auxiliary eccentric Ea with the help of the bearing BPGc, resp. BPGa. The transmission input shaft ISh is connected rigidly to the torque converter's 11 turbine rotor T through a first auxiliary eccentric Ea; the transmission output shaft OSh is connected with the main gear G of the eccentric gear set through a universal joint UJOsh and the main gearing's G shaft ShG, and the torque converter's impeller rotor P is connected with the planet gear PG through a disc D and a speed-multiplying direction of rotation-reversing gear Ga having kinematic transmission ratio ρ (assumed, for simplicity, to be equal to the dynamic transmission ratio) mounted rigidly on the planet gear's PG shaft ShPG, wherein the impeller P is connected with the gear Ga with the help of a number of eccentrics Ei, and the speed-multiplying auxiliary gear set Ga is mounted in the transmission's body with the help of a number of eccentrics Ej' in order to allow the gear Ga to execute orbiting motion relative the transmissions body. The input shaft Ish is supported for rotation relative the transmission's 10 body in a bearing BIsh. The output shaft Osh is supported for rotation relative the transmission's 10 body in a bearing BOsh. A second auxiliary eccentric Eb is supported for rotation relative the transmission's body in a bearing BEb. The main gear's G shaft ShG is supported for rotation relative the second auxiliary eccentric Eb in the bearing BShG. The eccentricity of the main eccentric E equals $r1-r=e>0$; the eccentricity of the first auxiliary eccentric Ea equals $ea \geq e$; the eccentricity of the second auxiliary eccentric Eb equals $eb=e-ea$, and the eccentric of the eccentrics Ei equals ea.

The transmission's input shaft ISh is connected with shaft of a prime mover, typically an internal combustion engine (not shown).

The torque converter of the transmission, according to the presented invention, must be large enough to absorb relatively large circulating power, and to allow to generate large output torque. To be more precise, the torque converter 11 of the transmission according to the instant invention destined for mating with a prime mover having maximum power PP and maximum output torque PT has nominal maximum input power lPP being a multiple of the maximum prime mover's power PP by a factor of l (where typically $l \in [8; 20]$), and nominal maximum input torque kPT being a multiple of the maximum prime mover's output torque PP by a factor of k (where typically k E [8; 20]).

Now a discussion of the operation (at equilibrium states) of the transmission follows.

During operation of the gear the following equations hold at equilibrium states (still assuming that $F_4(t)=-F_5(t)$):

19 $T_{r1}(t)=TS\,(0+T_t(t)$ (principal equations characterizing transmission according to the present invention: the resultant torque on the transmission input shaft is the sum of the torque on the prime mover shaft and the torque on the turbine rotor);

20 $T_{r1}(t)-e_a F_3(t)=0$ (equilibrium of the first auxiliary eccentric Ea);

21 $-r_1 F_2+\rho T_p(t)=0, F_2+F_3=0$ (equilibrium of the planet gear PG);

22 $r\, F_{2+r2}(t)=0$ (equilibrium of the ring gear G);

23 $T_E(t)=i_t(t)T_p(t)$ (where $i_t(t)<0$ if $\rho>0$);

Equations 20-23 immediately yield:

$$24\ T_p(t) = \frac{-1}{\frac{e_a \rho}{r_1} + i_t(t)} TS(t);$$

-continued $$25 \quad T_{r2}(t) = \frac{r\rho}{r_1 i_t(t) + e_a \rho} TS(t).$$

Example 3. For r=2, $r_1$=2.5,$e_a$=e=$r_1$-r=0.5, ρ=15, the following results are obtained assuming the Twin Disc torque converter as mentioned above is used, the characteristics of which is shown in FIG. 17: the transmission's output torque at stall ($n_2$=0) $|T_{r2stall}|$=$|T_{r2}|_{max}$≈30.0 TS, and $|T_{r2}|_{min}$≈5.0 TS. Since both the eccentricity ea of the first auxiliary eccentric Ea and the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb equals zero, and the ring gear G of the eccentric gear set executes purely rotational motion. This transmission features mediocre torque ratio spread equal to [5; 30], which renders it useful for e.g. city busses and off-road trucks.

Choosing the eccentricity ratio $e_a$ of the first auxiliary eccentric $e_a$=0.45 the following results are obtained: the transmission's output torque at stall ($n_2$=0) $|T_{r2stall}|$=$|T_{r2}|_{max}$≈120.0 TS, and $|T_{r2}|_{min}$ 4.8 TS. This transmission features exceptionally large torque ratio spread equal to [4.8; 120], which renders it useful for machines and vehicles subjected to loads varying within broad limits during operation process like e.g. for dozers, loaders, and tactical vehicles.

Figure 5:
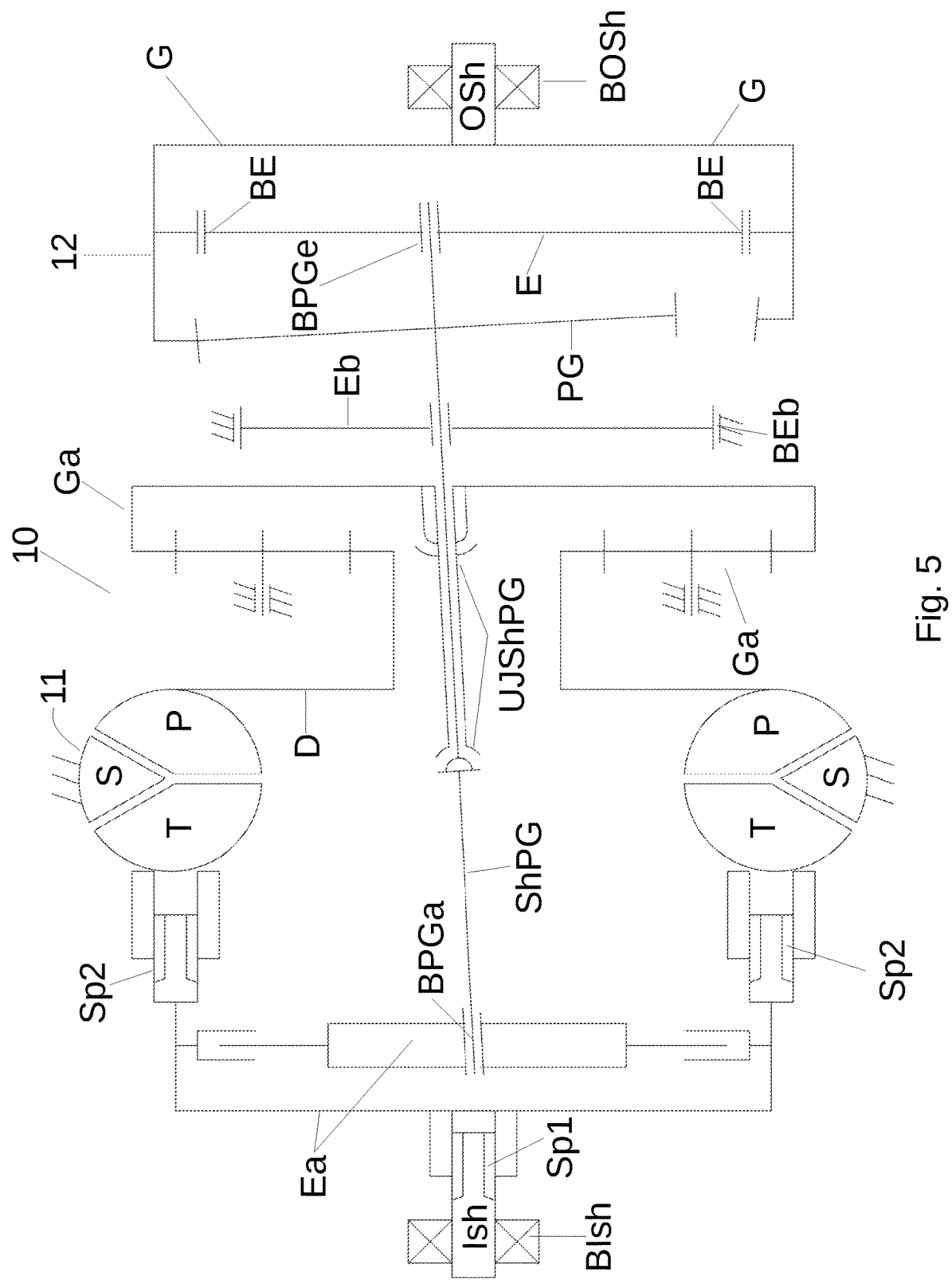
FIG. 5 shows schematically a third version of a first preferred embodiment of the invention, wherein the transmission includes a torque converter and an eccentric gear set equipped with bevel gears, having an externally toothed planet gear, wherein the transmission input shaft is connected directly to the torque converter turbine and an auxiliary eccentric of the eccentric gear set, the pump is connected to the planet gear of the eccentric gear set, and the output shaft is connected to a ring gear of the eccentric gear set, wherein the eccentricity of the auxiliary eccentric is variable.

C. Third version (FIG. 5). This version of the transmission according to the present invention includes a conventional torque-multiplying torque converter 11 with turbine and impeller rotors rotating in the same direction, and a bevel eccentric gear set 12 including a main (ring) internally toothed bevel gear G, an externally toothed planet bevel gear PG, and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. the first auxiliary eccentric Ea, resp. the second auxiliary eccentric Eb, with the help of the bearing BPGe, resp. BPGa, resp. BPGb, so that the planet gear's PG shaft ShPG is inclined relative the transmission's input shaft ISh and output shaft OSh at an acute angle α>0. The transmission input shaft ISh is connected slidably, with the help of a first and a second sets of splines Sp1, Sp2, to the torque converter's 11 turbine rotor T through a first auxiliary eccentric Ea of special construction enabling change of said first auxiliary eccentric's Ea eccentricity ea by moving the first auxiliary eccentric Ea along the transmission's input shaft ISh, while the first auxiliary eccentric Ea constantly supports the planet gear's PG shaft ShPG in the bearing BPGa (wherein the bearing BPGa is made able to move radially along one fixed (relative the first auxiliary eccentric Ea) direction relative the first auxiliary eccentric Ea); the transmission output shaft OSh is connected with the main gear G of the eccentric gear set, and the torque converter's impeller rotor P is connected with the planet gear's PG shaft ShPG through a speed-reducing, direction of rotation-reversing gear Ga (having kinematic transmission ratio ρ (assumed, for simplicity, to be equal to the dynamic transmission ratio)), and a constant velocity joint UJShPG (which enables the proper power transfer between the (mutually non-parallel) shafts of the planet gear PG, the speed-reducing gear Ga, and the propeller P). The input shaft Ish is supported for rotation relative the transmission's 10 body in a bearing BIsh. The output shaft Osh is supported for rotation relative the transmission's 10 body in a bearing BOsh. A second auxiliary eccentric Eb is supported for rotation relative the transmission's body in a bearing BEb.

The transmission's input shaft ISh is connected with shaft of a prime mover, typically an internal combustion engine (not shown).

The discussion of the operation (at equilibrium states) of the second preferred version of the transmission applies, almost literally, to this embodiment of the instant invention. In particular, all the equations 12-18 are applicable to the third version. The only essential novelty is that the eccentricity ea of the first auxiliary eccentric Ea is made variable (thus adding one more variable to the equilibrium equations 1-5 or 12-16), which makes characteristics of the transmission adaptable, and variable within broad limits. Moreover, the eccentricity ea of the first auxiliary eccentric Ea must be kept equal to the eccentricity e of the main eccentric E in order to satisfy these equations; now a description of a method for achieving this follows: Assume that the eccentricity ea of the first auxiliary eccentric Ea, the base transmission ratio $$\frac{r}{r_1} = \frac{z}{z_1},$$

and the acute angle α>0 between the axes of rotation of the main gear G and the planet gear PG are given; by choosing the cone angle of the planet bevel gear PG and the distance d between the main gear G and the point of intersection of the axes of rotation of the main gear G and the planet gear PG so as sin(α+β)/sin β=r/$r_1$ and d=eacos(α+β)/(sin(α+β)-sin β) I obtain: r=tg(α+β), $r_1$=dsin(β)/cos(α+β), e=r-$r_1$=ea.

Example 4. For r=10,$r_1$=9,$e_a$=e=r-$r_1$=1, ρ=-15, the following results are obtained, assuming the Twin Disc torque converter is used, the characteristics of which is shown in FIG. 17: the transmission's output torque at stall ($n_2$=0) $|T_{r2stall}|$=$|T_{r2}|_{max}$≈30.0 TS, and $|T_{r2}|_{min}$≈5.0 TS; by changing the eccentricity ratio $e_a$ of the first auxiliary eccentric Ea so that it achieves the value $e_a$=0.45 the following results are obtained: the transmission's output torque at stall ($n_2$=0) $|T_{r2stall}|$=$|T_{r2}|_{max}$≈120.0 TS, and $|T_{r2}|_{min}$≈4.8 TS. Thus the transmission's characteristics can be varied within broad limits just by slightly varying the eccentricity ratio $e_a$ of the first auxiliary eccentric Ea; this feature of the transmission in question renders it useful for machines and vehicles destined for exploitation in various environments like e.g. tactical vehicles.

Figure 6:
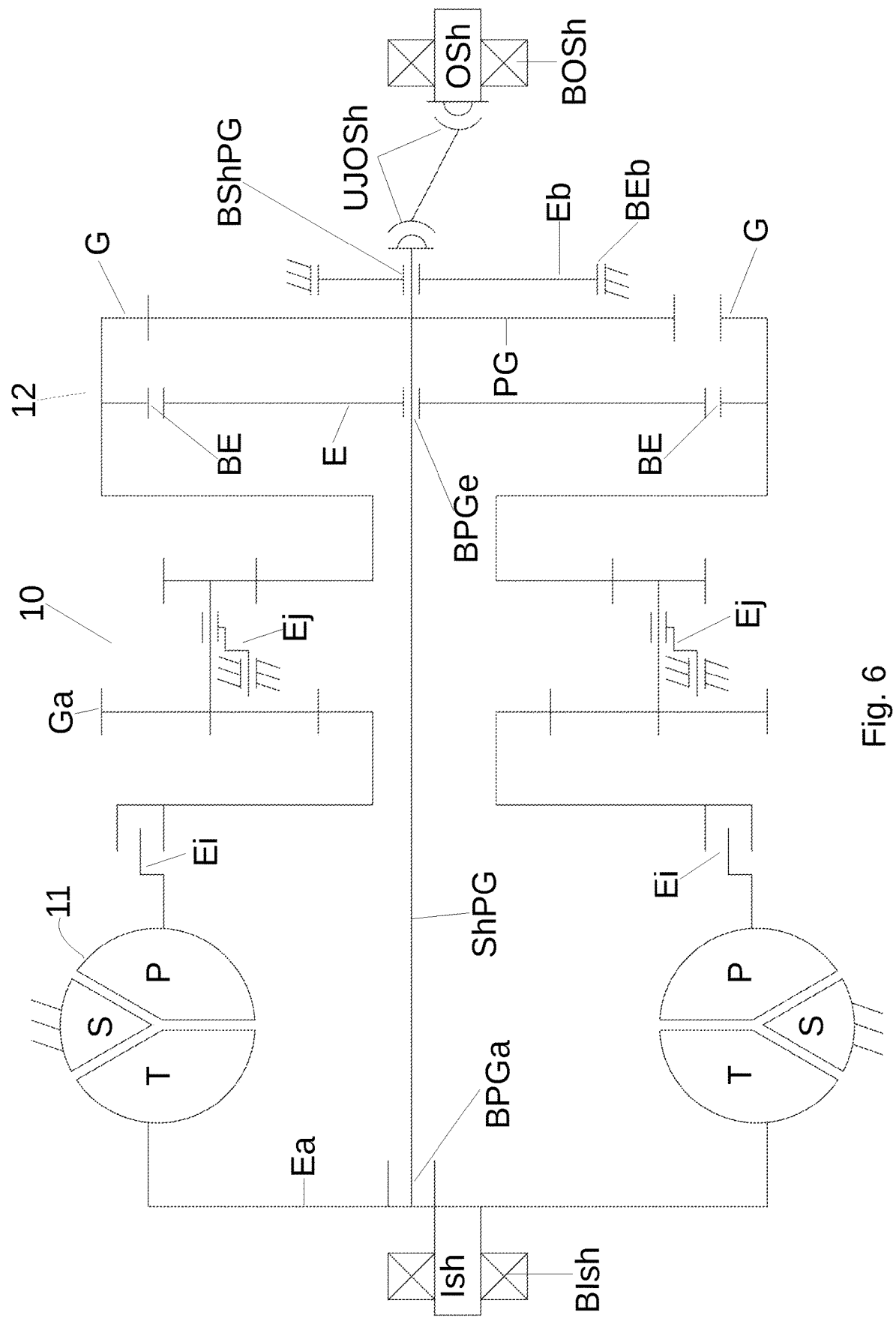
FIG. 6 shows schematically a first version of a second preferred embodiment of the invention, wherein the transmission includes a torque converter and an eccentric gear set equipped with spur gears, having an externally toothed planet gear, wherein the transmission input shaft is connected directly to the torque converter turbine and an auxiliary eccentric of the eccentric gear set, the pump is connected to the ring gear of the eccentric gear set through a speed-reducing gear, and the output shaft is connected, through an universal joint, to the planet gear of the eccentric gear set.
Figure 7:
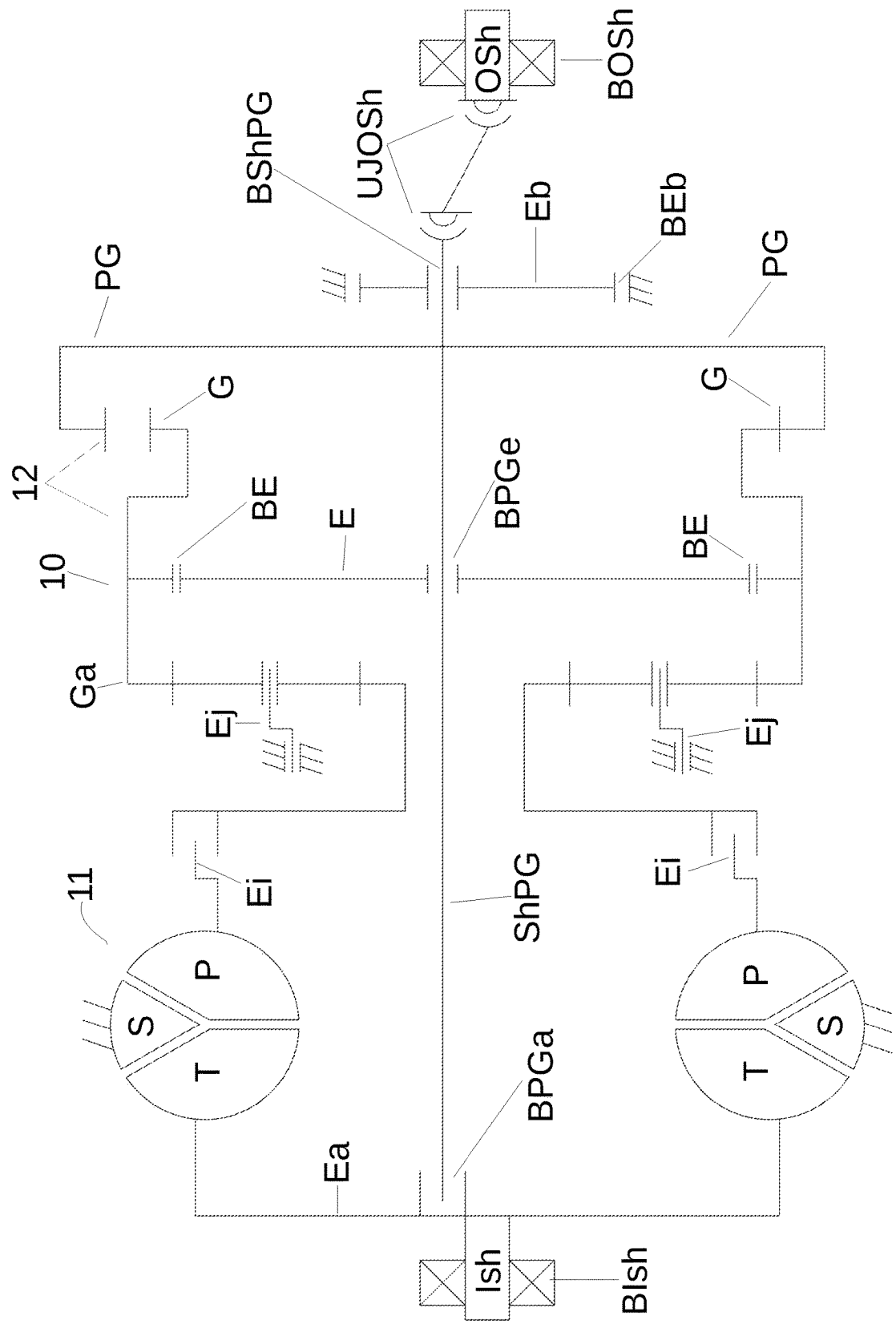
FIG. 7 shows schematically a second version of the second preferred embodiment of the invention, wherein the transmission includes a torque converter and an eccentric gear set equipped with spur gears, having an internally toothed planet gear, and an externally toothed main gear, wherein the transmission input shaft is connected directly to the torque converter turbine and an auxiliary eccentric of the eccentric gear set, the pump is connected to a main gear of the eccentric gear set through a speed-reducing gear, and the output shaft is connected, through a universal joint, to the planet gear of the eccentric gear set.
Figure 8:
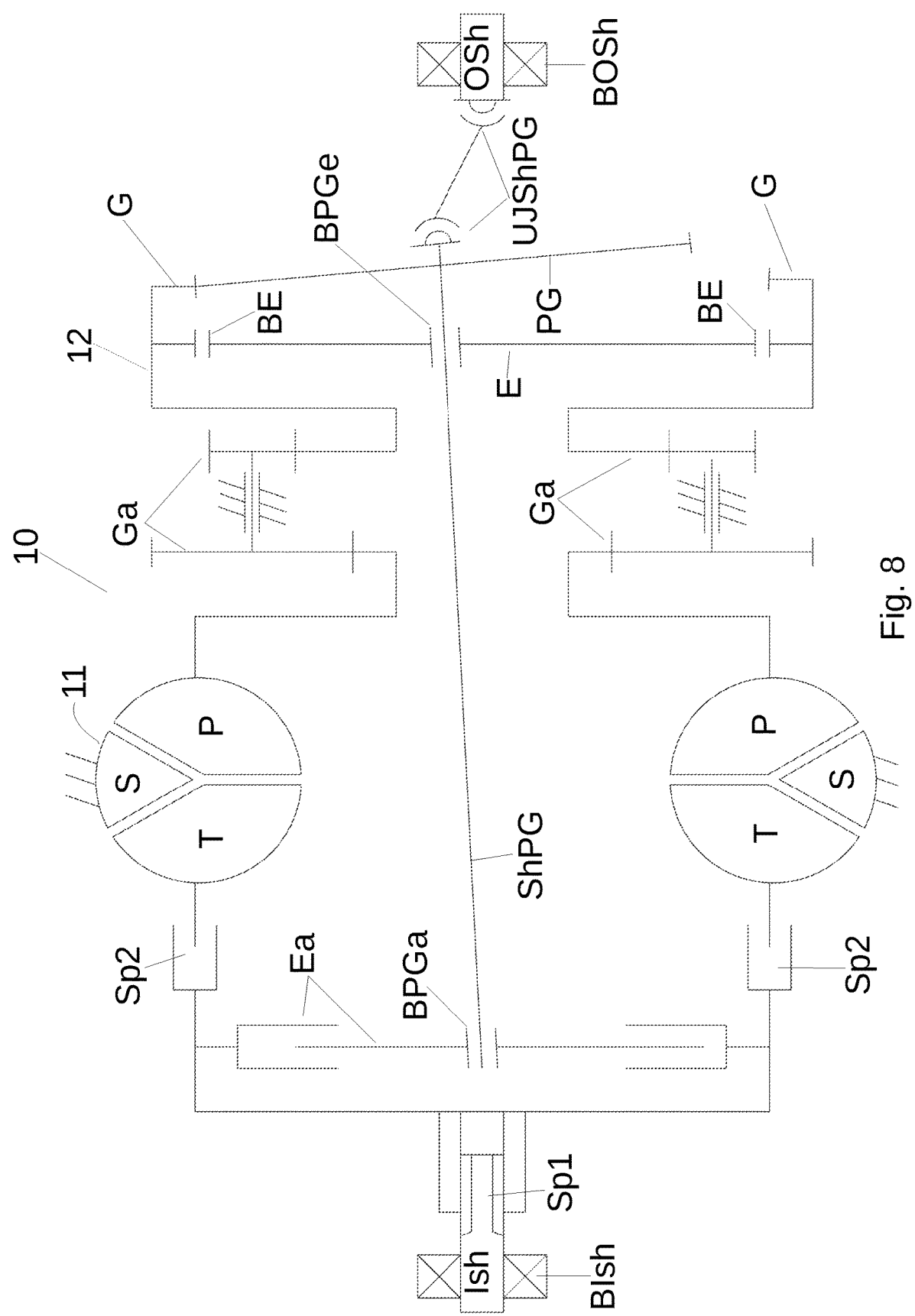
FIG. 8 shows schematically a third version of the second preferred embodiment of the invention, wherein the transmission includes a torque converter and an eccentric gear set equipped with bevel gears, having an externally toothed planet gear, and an internally toothed main gear, wherein the transmission input shaft is connected directly to the torque converter turbine and an auxiliary eccentric of the eccentric gear set, the pump is connected to a main gear of the eccentric gear set through a speed-reducing gear, and the output shaft is connected, through an universal joint, to the planet gear of the eccentric gear set, wherein the eccentricity of the auxiliary eccentric is variable.

Second Embodiment (FIGS. 6, 7, 8)

A. First version (FIG. 6). Transmission according to the present invention 10 includes a conventional torque-multiplying torque converter 11 with turbine and impeller rotors rotating in the same direction, and a typical eccentric gear set 12 including a main (ring) internally toothed gear G having a first radius r (expressed in teeth normal module units), an externally toothed planet gear PG having a second radius r1 (expressed in teeth normal module units), and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. the first auxiliary eccentric Ea, with the help of the bearing BPGe, resp. BPGa.

The transmission input shaft ISh is connected rigidly to the torque converter's 11 turbine rotor T through a first auxiliary eccentric Ea; the transmission output shaft OSh is connected with the planet gear PG of the eccentric gear set and the planet gear's PG shaft ShPG through a universal joint UJOsh, and the torque converter's impeller rotor P is connected through a number of eccentrics Ei with one member of a speed-reducing direction of rotation preserving gear set Ga, wherein the other member of the speed-reducing auxiliary gear set Ga is connected with the ring gear G of the eccentric gear set; the speed-reducing auxiliary gear set Ga is mounted in the transmission's body with the help of a number of eccentrics Ej that secures the gear Ga against rotation, while enabling it to execute orbiting motion relative the transmission's body. The input shaft Ish is supported for rotation relative the transmission's 10 body in a bearing BIsh. The output shaft Osh is supported for rotation relative the transmission's 10 body in a bearing BOsh. The eccentricity of the main eccentric E equals e=r−r1>0; the eccentricity of the first auxiliary eccentric Ea equals 0≤ea≤e; the eccentricity of the eccentrics Ei and Ej' equals e−ea.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states:

26 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

27 $T_{r1}(t)-F_3(t)=0$ (equilibrium of the first auxiliary eccentric Ea);

28 $r_1F_2+T_{r2}(t)=0$, $F_2+F_3=0$ (equilibrium of the planet gear PG);

29 $-rF_2+\rho T_p(t)=0$ (equilibrium of the ring gear G, $\rho>0$);

30 $T_t(t)=i_t(t)T_p(t)$ (where $i_t(t)<0$ if $\rho>0$);

Equations 26-30 immediately yield:

$$T_p(t) = \frac{-1}{\frac{e_a}{r}\rho + i_t(t)} TS(t); \quad 31$$

$$T_{r2}(t) = \frac{r_1\rho}{ri_t(t) + e_a\rho} TS(t). \quad 32$$

EXAMPLE 5. Assume that the conventional torque converter is used having the characteristics as shown in FIG. 17; let r=10.5, $r_1$=9, $e_a$=e=r−$r_1$=1.5, $\rho$=10.5; then the following results are obtained: the transmission's output torque at stall ($n_2$=0) $|T_{r2stall}|$=45 TS, and $|T_{r2min}|$≈6.43 TS. Since both the eccentricity ea of the first auxiliary eccentric Ea and the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb equals zero, and the ring gear G of the eccentric gear set executes purely rotational motion.

For $e_a$=1.4 and all the other parameters unchanged Equation 10 gives:

$|T_{r2stall}|$=90 TS, and $|T_{r2min}|$≈6.92 TS. Since the eccentricity ea of the first auxiliary eccentric Ea is not equal to the eccentricity e=r−$r_s$=1.5 of the main eccentric E, the eccentricity of the eccentrics Ei and Ej' equals e−ea=0.1, and the ring gear G of the eccentric gear set executes compound rotational-orbiting motion relative the transmission's body. This transmission features exceptionally large torque ratio spread equal to [6.92; 90], which renders it useful for machines and vehicles subjected to loads varying within broad limits during operation process like e.g. for tactical vehicles.

B. Second version (FIG. 7). Transmission according to the present invention 10 includes a conventional torque-multiplying torque converter 11 with turbine and impeller rotors rotating in the same direction, and a typical eccentric gear set 12 including a main externally toothed gear G having a first radius r (expressed in teeth normal module units), an internally toothed (ring) planet gear PG having a second radius r1 (expressed in teeth normal module units), and a main eccentric E supported for rotation relative the main gear G in the bearing BE, wherein the planet gear's PG shaft ShPG is supported for rotation relative the main eccentric E, resp. the first auxiliary eccentric Ea, resp. the second auxiliary eccentric Eb, with the help of the bearing BPGe, resp. BPGa, resp. BPGb; wherein the main eccentric keeps the main gear and the planet gear in permanent meshing. The transmission input shaft ISh is connected rigidly to the torque converter's 11 turbine rotor T through a first auxiliary eccentric Ea; the transmission output shaft OSh is connected with the planet gear PG of the eccentric gear set and the planet gear's PG shaft ShPG through a universal joint UJOSh, and the torque converter's impeller rotor P is connected through a number of eccentrics Ei with one member of a speed-reducing direction of rotation reversing gear set Ga, wherein the other member of the speed-reducing auxiliary gear set Ga is connected with the main gear G of the eccentric gear set; the speed-reducing auxiliary gear set Ga is mounted in the transmission's body with the help of a number of eccentrics Ej' that secures the gear Ga against rotation, while enabling it to execute orbiting motion relative the transmission's body. The input shaft ISh is supported for rotation relative the transmission's 10 body in a bearing BIsh. The output shaft Osh is supported for rotation relative the transmission's 10 body in a bearing BOsh. The eccentricity of the main eccentric E equals e=r−r1>0; the eccentricity of the first auxiliary eccentric Ea equals 0≤ea≤e; the eccentricity of the eccentrics Ei and Ej' equals ea−e.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states (still assuming that $F_4(t)=-F_5(t)$):

33 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

34 $T_{r1}(t)-e_aF_3(t)=0$ (equilibrium of the first auxiliary eccentric Ea);

35 $-r_1F_2+T_{r2}(t)=0$, $F_2+F_3=0$ (equilibrium of the planet gear PG);

36 $rF_2+\rho T_p(t)=0$ (equilibrium of the ring gear G, $\rho<0$);

37 $T_t(0)=i_t(t)T_p(t)$ (where $i_t(t)<0$ if $\rho<0$);

Equations 33-37 immediately yield:

$$T_p(t) = \frac{r}{e_a\rho - ri_t(t)} TS(t); \quad 38$$

-continued $$T_{r2}(t) = \frac{r_1}{ri_t(t) - e_a\rho} TS(t). \qquad 39$$

EXAMPLE 6. Assume that the conventional torque converter is used having the characteristics as shown in FIG. 17; let r=9, $r_1$=12, e=$r_1$−r=3, $e_a$=2.5; then the following results are obtained: the transmission's output torque at stall ($n_2$=0) $|T_{r2stall}|$≈60 TS, and $|T_{r2min}|$≈0.659 TS. Since the eccentricity ea of the first auxiliary eccentric Ea is smaller than the eccentricity e of the main eccentric E (expressed in units of normal module of teeth of the gears G and PG), the eccentricity e−ea of the eccentrics Ei and Ej' equals 0.5, and the ring gear G of the eccentric gear set executes compound rotational-orbiting motion.

This transmission features exceptionally large torque ratio spread equal to [0.659; 60], which renders it useful for machines and vehicles subjected to loads varying in broad limits during operation process like e.g. dozers, loaders, and tactical vehicles, and also for machines working with speeds varying within very wide limits like farm tractors.

C. Third version (FIG. 8). This version of the transmission according to the present invention includes a conventional torque-multiplying torque converter 11 with turbine and impeller rotors rotating in the same direction, and a bevel eccentric gear set 12 including a main (ring) internally toothed bevel gear G, an externally toothed planet bevel gear PG, and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. the first auxiliary eccentric Ea, with the help of the bearing BPGe, resp. BPGa, so that the planet gear's PG shaft ShPG is inclined relative the transmission's input shaft ISh and output shaft OSh at an acute angle α>0. The transmission input shaft ISh is connected slidably, with the help of spline joint Sp1, to the torque converter's 11 turbine rotor T through a first auxiliary eccentric Ea of special construction with the help of splines SP1, SP2, enabling change of said first auxiliary eccentric's Ea eccentricity ea by moving the first auxiliary eccentric Ea along the transmission's input shaft ISh, while the first auxiliary eccentric Ea constantly supports the planet gear's PG shaft ShPG in the bearing BPGa (wherein the bearing BPGa is made able to move radially along one fixed (relative the first auxiliary eccentric Ea) direction relative the first auxiliary eccentric Ea); the transmission output shaft OSh is connected with the planet gear PG of the eccentric gear set through a constant velocity joint UJOSh, and the torque converter's impeller rotor P is connected with the main gear's G shaft ShG through a speed-reducing, direction of rotation-preserving gear Ga (having kinematic transmission ratio ρ (assumed, for simplicity, to be equal to the dynamic transmission ratio)). The input shaft Ish is supported for rotation relative the transmission's 10 body in a bearing BIsh. The output shaft Osh is supported for rotation relative the transmission's 10 body in a bearing BOsh.

The transmission's input shaft ISh is connected with shaft of a prime mover, typically an internal combustion engine (not shown).

The discussion of the operation (at equilibrium states) of the first version of the second preferred embodiment of the transmission applies, almost literally, to this embodiment of the instant invention. The only essential novelty is that the eccentricity ea of the first auxiliary eccentric Ea is made variable (thus adding one more variable to the equilibrium equations 26-30), which makes characteristics of the transmission adaptable, and variable within broad limits.

EXAMPLE 7. Assume that the conventional torque converter is used having the characteristics as shown in FIG. 17; let r=10.5, $r_1$=9,$e_a$=e=r−$r_1$=1.5, ρ=10.5; then the following results are obtained: the transmission's output torque at stall ($n_2$=0) $|T_{r2stall}|$=45 TS, and 6.43 TS; by changing the eccentricity of the first auxiliary eccentric to achieve the value $e_0$=1.4, while keeping all the other parameters unchanged, the following results are obtained (see Equation 32): $|T_{r2stall}|$=90 TS, and $|T_{r2min}|$≈4.74 TS; taking $e_a$=2 one obtains $|T_{r2stall}|$=12.86 TS, and $|T_{r2min}|$≈4.74 TS. This transmission features exceptionally large torque ratio spread equal to [4.74; 90], which renders it useful for machines and vehicles subjected to loads varying within broad limits during operation process like e.g. for dozers, loaders, and tactical vehicles.

Figure 9:
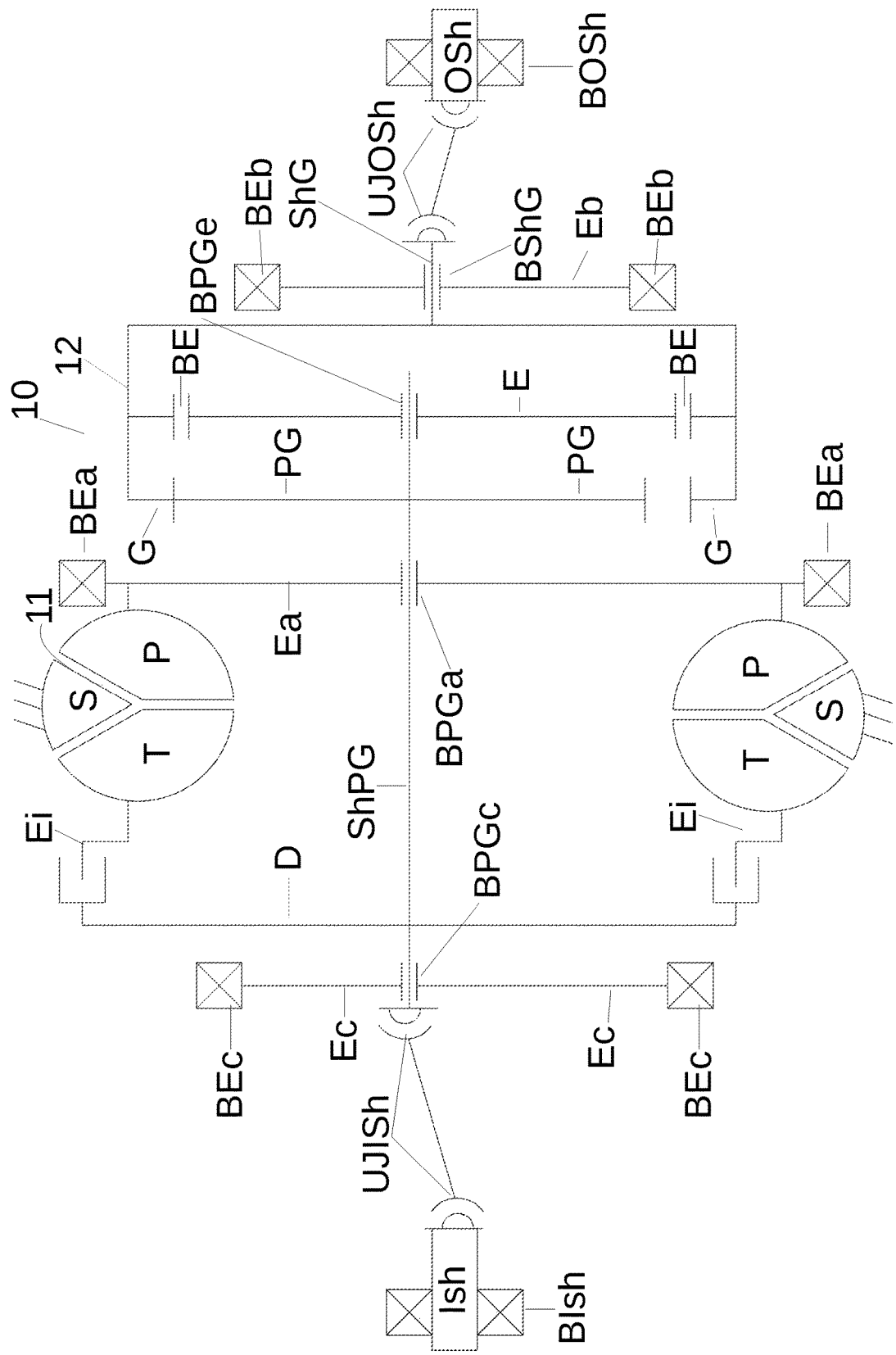
FIG. 9 shows schematically a first version of a third preferred embodiment of the invention, wherein the transmission includes a torque converter and an eccentric gear set equipped with spur gears, having an externally toothed planet gear, and an internally toothed main gear, wherein the transmission input shaft is connected, through a universal joint, to the torque converter turbine and the planet gear of the eccentric gear set, the pump is connected to an auxiliary eccentric of the eccentric gear set, and the output shaft is connected, through another universal joint, to the ring gear of the eccentric gear set.
Figure 10:
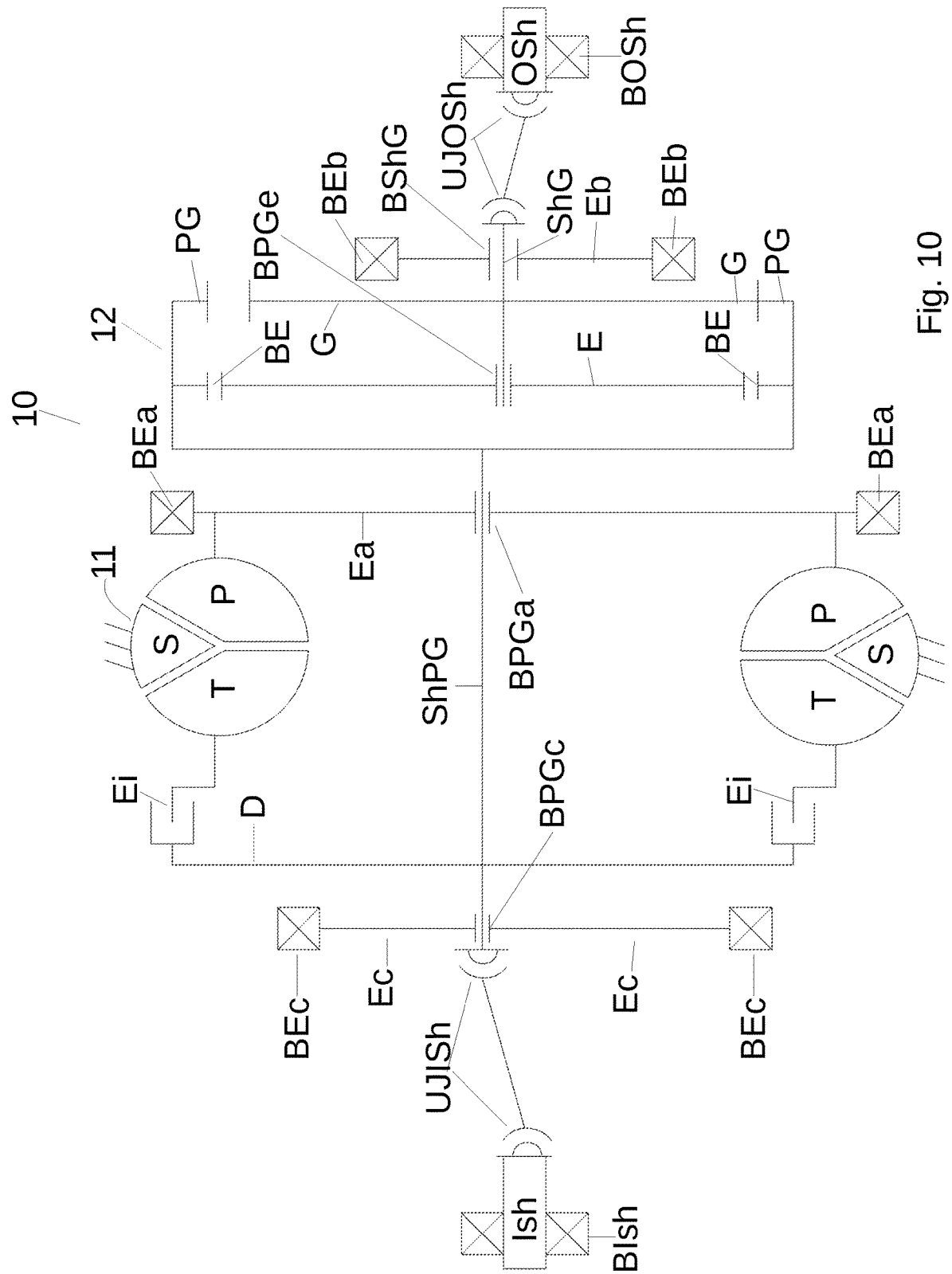
FIG. 10 shows schematically a second version of the third preferred embodiment of the invention, wherein the transmission includes a torque converter and an eccentric gear set equipped with spur gears, having an internally toothed planet gear, and an externally toothed main gear, wherein the transmission input shaft is connected, through an universal joint, to the torque converter turbine and the planet gear of the eccentric gear set, the pump is connected to an auxiliary eccentric of the eccentric gear set, and the output shaft is connected, through another universal joint, to a main gear of the eccentric gear set.
Figure 11:
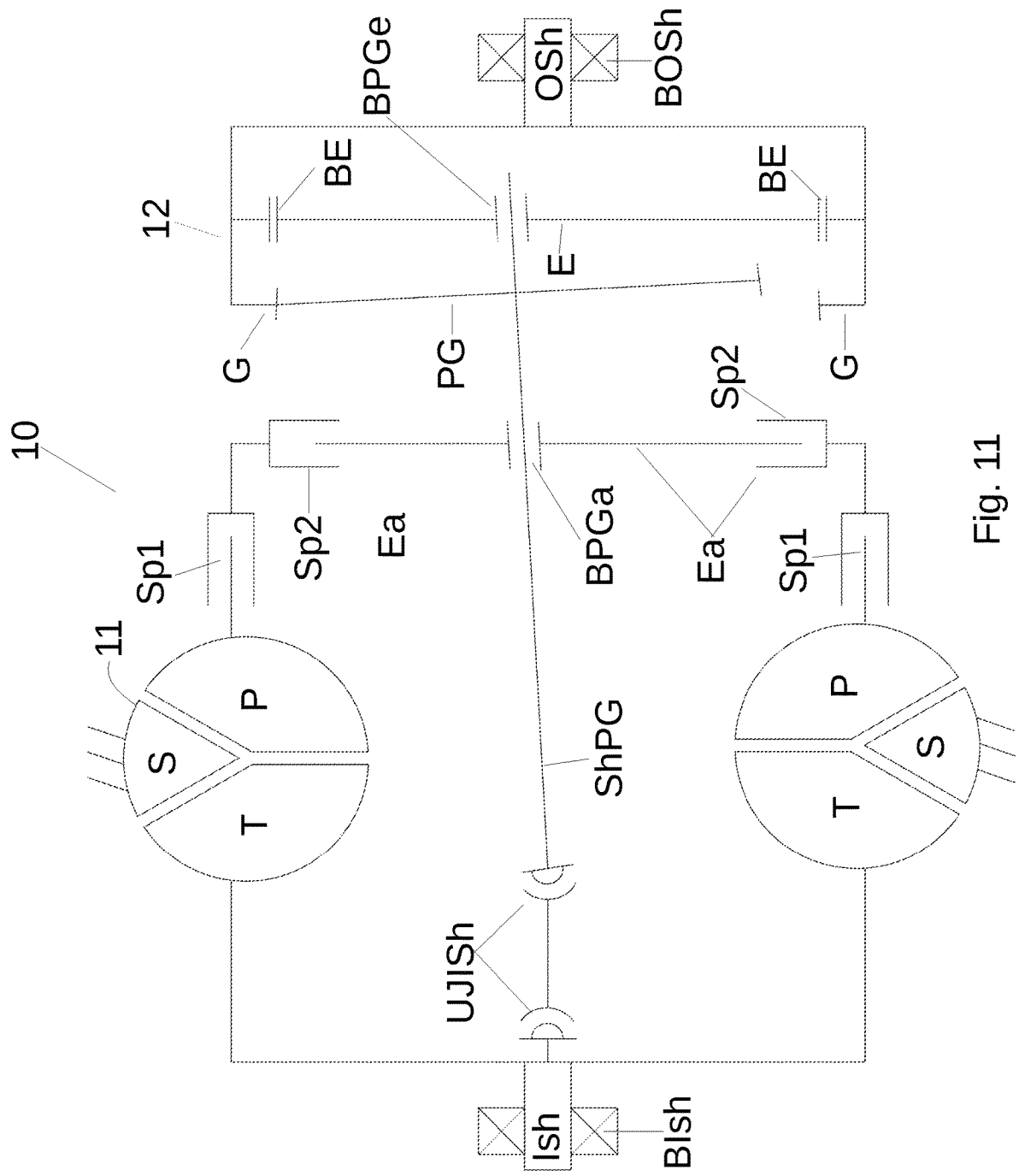
FIG. 11 shows schematically a third version of the third preferred embodiment of the invention, wherein the transmission includes a torque converter and an eccentric gear set equipped with bevel gears, having an internally toothed planet gear, and an externally toothed main gear, wherein the transmission input shaft is connected to the torque converter turbine and the planet gear of the eccentric gear set, the pump is connected to an auxiliary eccentric of the eccentric gear set, and the output shaft is connected to the main gear of the eccentric gear set, wherein the eccentricity of the auxiliary eccentric is variable.

Third Embodiment (FIGS. 9, 10, 11)

A. First version (FIG. 9). Transmission according to the present invention 10 includes a conventional torque-multiplying torque converter 11 with turbine and impeller rotors rotating in mutually opposite directions, and a typical eccentric gear set 12 including a main (ring) internally toothed gear G having a first radius r (expressed in teeth normal module units), an externally toothed planet gear PG having a second radius r1 (expressed in teeth normal module units), and a main eccentric E supported for rotation relative the main gear G in the bearing BE, wherein the planet gear's PG shaft ShPG is supported for rotation relative the main eccentric E, resp. a first auxiliary eccentric Ea, resp. a third auxiliary eccentric Ec, with the help of the bearing BPGe, resp. BPGa, resp. BPGc; the third auxiliary eccentric Ec is supported for rotation relative the transmission body through a bearing BEc; wherein the main eccentric keeps the main gear and the planet gear in permanent meshing. The transmission's input shaft ISh is connected to the planet gear's PG shaft ShPG through a constant velocity joint UJISh and a disc D, while the disc D is connected to the torque converter's 11 turbine rotor T with the help of a number of auxiliary eccentrics Ei; this connection causes the input shaft rotates in unison with the disc D and the turbine rotor T (which executes purely rotational motion relative the transmission's body), while the disc D and the planet gear PG is free to execute orbiting motion relative the turbine rotor T. The transmission's output shaft OSh is connected with the main gear G of the eccentric gear set G through a universal joint UJOSh, and the main gear G is supported for rotation relative the transmission's body in a second auxiliary eccentric Eb through a bearing BShG; the second auxiliary eccentric Eb is supported for rotation relative the transmission body in the bearing BEb. The torque converter's impeller rotor P is connected rigidly with the first auxiliary eccentric Ea; the first auxiliary eccentric Ea is supported for rotation relative the transmission body through a bearing BEa. The input shaft Ish is supported for rotation relative the transmission's 10 body in a bearing BIsh. The output shaft Osh is supported for rotation relative the transmission's 10 body in a bearing BOsh. The eccentricity of the main eccentric E equals e=r−r1>0; the eccentricity of the first auxiliary eccentric Ea equals ea≥e; the eccentricity of the eccentrics Ei equals ea; the eccentricity of the second auxiliary eccentric Eb equals ea−e.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states:

40 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

41 $T_p(t)-e_a F_3(t)=0$ (equilibrium of the first auxiliary eccentric Ea);

42 $T_{r1}(t)+r_1F_2=0, F_2+F_3=0$ (equilibrium of the planet gear PG);

43 $T_{r2}(t)-rF_2=0$ (equilibrium of the ring gear G);

44 $T_t(t)=i_t(t)T_p(t)$ (where $i_t(t)>0$);

Equations 41-44 immediately yield:

$$T_p(t) = \frac{e_a}{r_1 - e_a i_t(t)} TS(t); \quad\quad 45$$

$$T_{r2}(t) = \frac{-r}{r_1 - e_a i_t(t)} TS(t). \quad\quad 46$$

Example 8. Assume that the conventional torque converter is used having the characteristics as shown in FIG. 17; let $r=12$, $r_1=9$, $e=r-r_1=3$, $e_a=3.7$; then the following results are obtained: the transmission's output torque at stall ($n_2=0$) $|T_{r2stall}|\approx 100$ TS, $|T_{r2min}|\approx 1.45$ TS; for $r=9, r_1=6$, $e=r-r_1=3$, $e_a=3$; then $|T_{r2stall}|\approx 10$ TS, $|T_{r2min}|\approx 1.58$ TS; for $e_a=3.4$ and other parameters unchanged $|T_{r2stall}|\approx 40.9$ TS, $|T_{r2min}|\approx 1.59$ TS; for $e_a=3.5$ and other parameters unchanged $|T_{r2stall}|\approx 180$ TS, $|T_{r2min}|\approx 1.59$ TS.

Since the eccentricity ea of the first auxiliary eccentric Ea is not equal to the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb is non-zero, and the ring gear G of the eccentric gear set executes compound rotational-orbiting motion.

This transmission features exceptionally large torque ratio spread equal even to [1.59; 180], which renders it useful for machines and vehicles subjected to loads varying within broad limits during operation process like for dozers, loaders, tactical vehicles, and farm tractors.

B. Second version (FIG. 10). Transmission according to the present invention 10 includes a conventional torque-multiplying torque converter 11 with turbine and impeller rotors rotating in the same direction, and a typical eccentric gear set 12 including a main externally toothed gear G having a first radius r (expressed in teeth normal module units), an internally toothed (ring) planet gear PG having a second radius r1 (expressed in teeth normal module units), and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. a first auxiliary eccentric Ea, with the help of the bearing BPGe, resp. BPGa. The transmission's input shaft ISh is connected to the planet gear's PG shaft ShPG through a constant velocity joint UJISh and a disc D, while the disc D is connected to the torque converter's 11 turbine rotor T with the help of a number of auxiliary eccentrics Ei; this connection causes the input shaft rotates in unison with the disc D and the turbine rotor T (which executes purely rotational motion relative the transmission's body), while the disc D and the planet gear PG is free to execute orbiting motion relative the turbine rotor T. The transmission's output shaft OSh is connected with the main gear G of the eccentric gear set G through a universal joint UJOSh, and the main gear G is supported for rotation relative the transmission's body in a second auxiliary eccentric Eb through a bearing BShG; the second auxiliary eccentric Eb is supported for rotation relative the transmission body in a bearing BEb. The torque converter's impeller rotor P is connected rigidly with the first auxiliary eccentric Ea. The input shaft Ish is supported for rotation relative the transmission's 10 body in a bearing BIsh. The output shaft Osh is supported for rotation relative the transmission's 10 body in a bearing BOsh. The eccentricity of the main eccentric E equals $e=r1-r>0$; the eccentricity of the first auxiliary eccentric Ea equals $ea \geq e$; the eccentricity of the eccentrics Ei equals ea; the eccentricity of the second auxiliary eccentric Eb equals ea−e.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states:

47 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

48 $T_p(t)+e_aF_3(t)=0$ (equilibrium of the first auxiliary eccentric Ea);

49 $T_{r1}(t)+r_1F_2=0, F_2+F_3=0$ (equilibrium of the planet gear PG);

50 $T_{r2}(t)-rF_2=0$ (equilibrium of the ring gear G, $\rho>0$);

51 $T_t(t)=i_t(t)T_p(t)$ (where $i_t(t)<0$);

Equations 47-50 immediately yield:

$$T_p(t) = \frac{-e_a}{r_1 + e_a i_t(t)} TS(t); \quad\quad 52$$

$$T_{r2}(t) = \frac{-r}{r_1 + e_a i_t(t)} TS(t). \quad\quad 53$$

EXAMPLE 9. Assume that the conventional torque converter is used having the characteristics as shown in FIG. 17; let $r=9$, $r_1=10.5, e=r_1-r=1.5$, $e_a=2.6$; then the following results are obtained: the transmission's output torque at stall ($n_2=0$) $|T_{r2stall}|\approx 90$ TS, $|T_{r2min}|\approx 0.9$ TS.

Since the eccentricity ea of the first auxiliary eccentric Ea is not equal to the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb is non-zero, and the ring gear G of the eccentric gear set executes compound rotational-orbiting motion.

This transmission features exceptionally large torque ratio spread equal even to [0.9; 90], which renders it useful for machines and vehicles subjected to loads varying within broad limits during operation process like for dozers, loaders, tactical vehicles, and farm tractors.

C. Third version (FIG. 11). This version of the transmission according to the present invention includes a conventional torque-multiplying torque converter 11 with turbine and impeller rotors rotating in mutually opposite directions, and a bevel eccentric gear set 12 including a main (ring) internally toothed bevel gear G, an externally toothed planet bevel gear PG, and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. the first auxiliary eccentric Ea, with the help of the bearing BPGe, resp. BPGa, so that the planet gear's PG shaft ShPG is inclined relative the transmission's input shaft ISh and output shaft OSh at an acute angle α>0. The transmission input shaft ISh is connected rigidly to the torque converter's 11 turbine rotor T, and to the planet gear's PG shaft ShPG through a constant velocity joint UJISh; the torque converter's impeller rotor P is connected with the first auxiliary eccentric Ea of special construction through splines SP1, SP2, enabling change of said first auxiliary eccentric's Ea eccentricity ea by moving the first auxiliary eccentric Ea along the planet gear's PG shaft ShPG, while the first auxiliary eccentric Ea constantly supports the planet gear's PG shaft ShPG in the bearing BPGa (wherein the bearing BPGa is made able to move radially along one fixed (relative the first auxiliary eccentric Ea) direction relative the first auxiliary eccentric Ea); the transmission output shaft OSh is connected rigidly with the main gear PG of the eccentric gear set. The input shaft Ish is supported for rotation relative the transmission's 10 body in a bearing BIsh. The output shaft Osh is supported for rotation relative the transmission's 10 body in a bearing BOsh.

The transmission's input shaft ISh is connected with shaft of a prime mover, typically an internal combustion engine (not shown).

The discussion of the operation (at equilibrium states) of the first version of the third preferred embodiment of the transmission applies, almost literally, to this embodiment of the instant invention. The only essential novelty is that the eccentricity ea of the first auxiliary eccentric Ea is made variable (thus adding one more variable to the equilibrium equations 41-44), which makes characteristics of the transmission adaptable, and variable within broad limits.

EXAMPLE 10. Assume that the conventional torque converter is used having the characteristics as shown in FIG. 17; let $r=9, r_1=6, e=r-r_1=3, e_a=3$; then $|T_{r2stall}|\approx 10$ TS, $|T_{r2min}|\approx 1.58$ TS; by varying the eccentricity of the first auxiliary eccentric Ea so that it achieves the value $e_a=3.4$ one obtains $|T_{r2stall}|\approx 40.9$ TS, $|T_{r2min}|\approx 1.59$ TS; by further varying the eccentricity of the first auxiliary eccentric Ea so that it achieves the value $e_a=3.5$ one gets $|T_{r2stall}|\approx 180$ TS, $|T_{r2min}|\approx 1.59$ TS. Thus the transmission's characteristics can be varied within broad limits just by slightly varying the eccentricity ratio $e_a$ of the first auxiliary eccentric Ea; this feature of the transmission in question renders it useful for machines and vehicles destined for exploitation in various environments like e.g. tactical vehicles and farm tractors.

Figure 12:
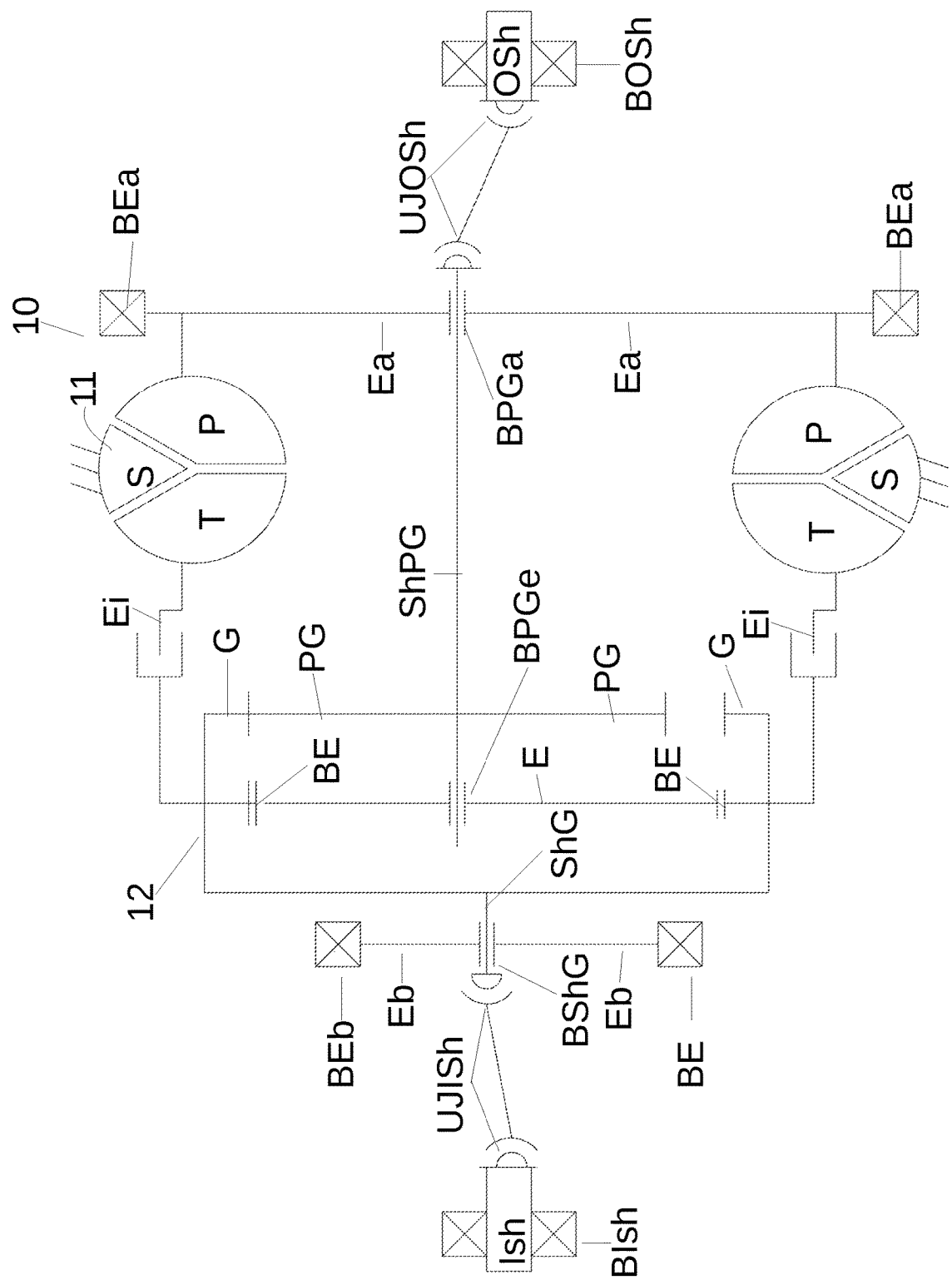
FIG. 12 shows schematically a first version of a fourth preferred embodiment of the invention, wherein the transmission includes a torque converter and an eccentric gear set equipped with spur gears, having an externally toothed planet gear, and an internally toothed main gear, wherein the transmission input shaft is connected, through an universal joint, to the torque converter turbine and a ring gear of the eccentric gear set, the pump is connected to an auxiliary eccentric of the eccentric gear set, and the output shaft is connected, through another universal joint, to the planet gear of the eccentric gear set.
Figure 13:
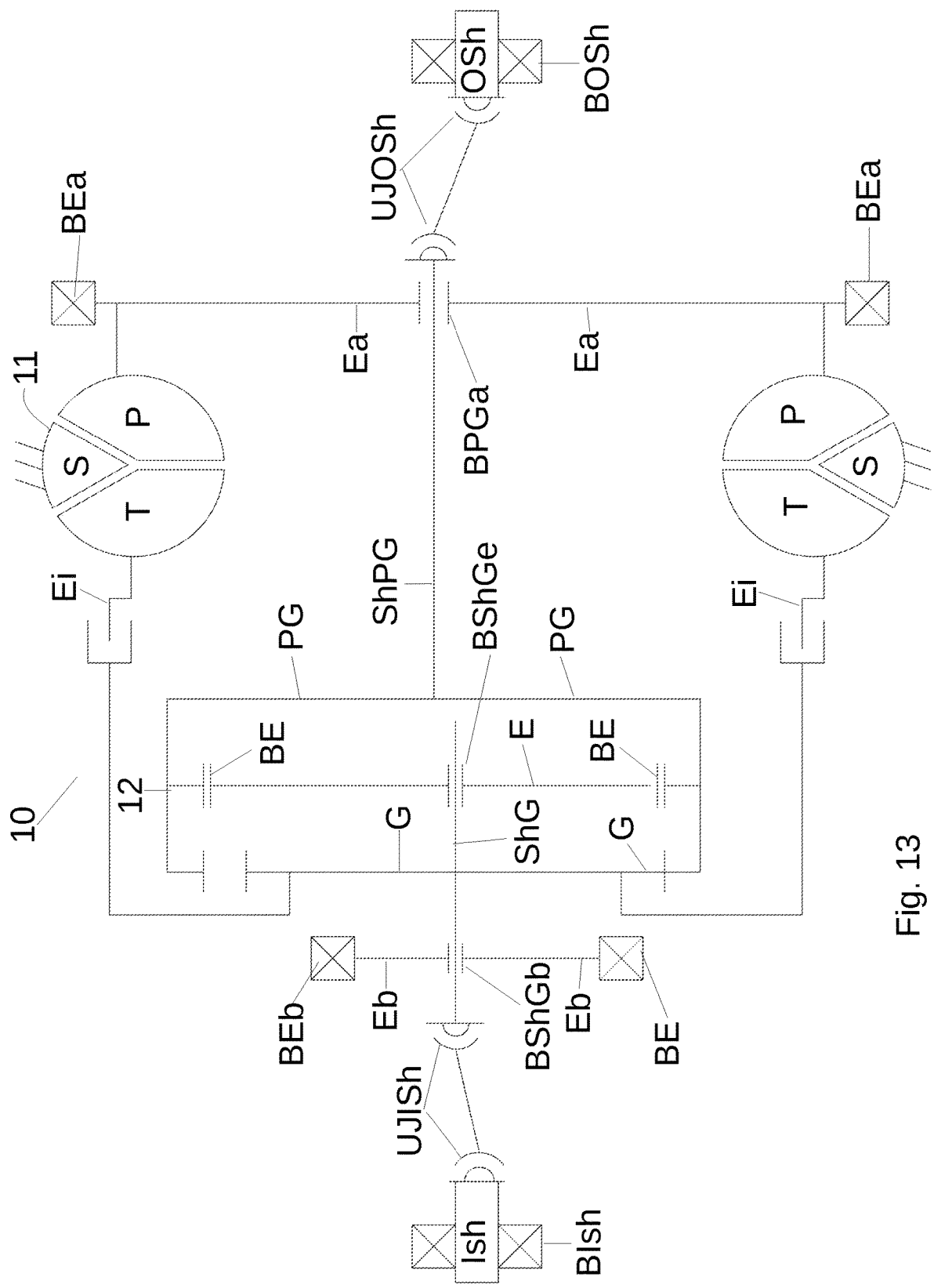
FIG. 13 shows schematically a second version of the fourth preferred embodiment of the invention, wherein the transmission includes a torque converter and an eccentric gear set equipped with spur gears, having an internally toothed planet gear, and an externally toothed main gear, wherein the transmission input shaft is connected, through an universal joint, to the torque converter turbine and a main gear of the eccentric gear set, the pump is connected to an auxiliary eccentric of the eccentric gear set, and the output shaft is connected, through another universal joint, to the planet gear of the eccentric gear set.
Figure 14:
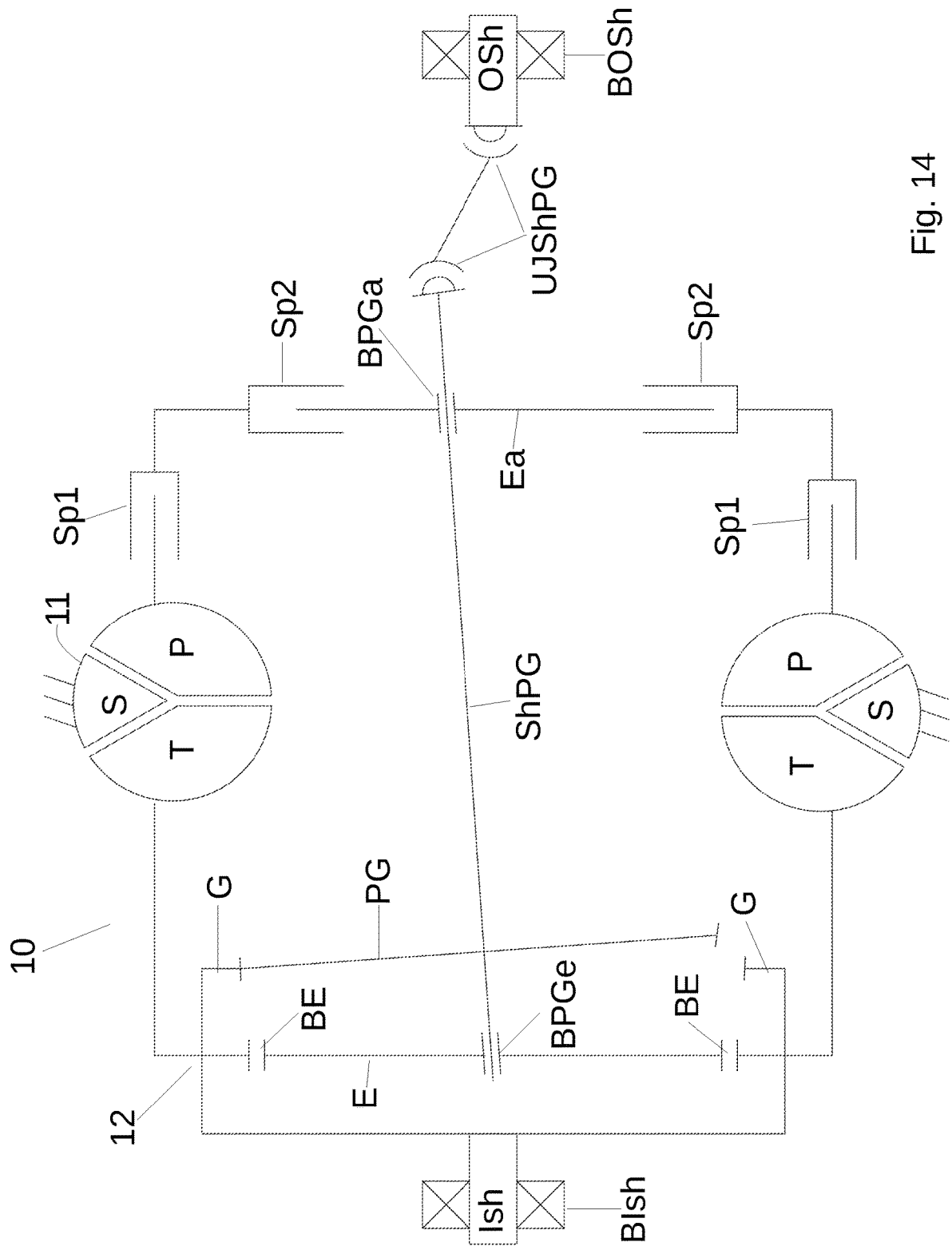
FIG. 14 shows schematically a third version of the fourth preferred embodiment of the invention, wherein the transmission includes a torque converter and an eccentric gear set equipped with bevel gears, having an externally toothed planet gear, and an internally toothed main gear, wherein the transmission input shaft is connected, through an universal joint, to the torque converter turbine and a main gear of the eccentric gear set, the pump is connected to an auxiliary eccentric of the eccentric gear set, and the output shaft is connected, through another universal joint, to the planet gear of the eccentric gear set, wherein the eccentricity of the auxiliary eccentric is variable.

Fourth Embodiment (FIGS. 12, 13, 14)

A. First version (FIG. 12). Transmission according to the present invention 10 includes a conventional torque-multiplying torque converter 11 with turbine and impeller rotors rotating in the same direction, and a typical eccentric gear set 12 including a main (ring) internally toothed gear G having a first radius r (expressed in teeth normal module units), an externally toothed planet gear PG having a second radius r1 (expressed in teeth normal module units), and a main eccentric E supported for rotation relative the main gear G in the bearing BE; wherein the main eccentric keeps the main gear and the planet gear in permanent meshing; wherein the planet gear's PG shaft ShPG is supported for rotation relative the main eccentric E, resp. a first auxiliary eccentric Ea, with the help of a bearing BPGe, resp. BPGa. The transmission's input shaft ISh is connected to the main gear G through a constant velocity joint UJISh, while the main gear G is connected to the torque converter's 11 turbine rotor T with the help of a number of auxiliary eccentrics Ei; this connection causes the input shaft rotates in unison with the main gear G and the turbine rotor T (which executes purely rotational motion relative the transmission's body), while the whole eccentric gear 12 is free to execute orbiting motion relative the turbine rotor T; the main gear's G shaft ShG is supported for rotation relative the transmission's body in a second auxiliary eccentric Eb through a bearing BShG; the second auxiliary eccentric Eb is supported for rotation relative the transmission body in a bearing BEb. The transmission's output shaft OSh is connected with the planet gear PG of the eccentric gear set through a universal joint UJOSh. The torque converter's impeller rotor P is connected rigidly with the first auxiliary eccentric Ea. The input shaft Ish is supported for rotation relative the transmission's 10 body in a bearing BIsh. The output shaft Osh is supported for rotation relative the transmission's 10 body in a bearing BOsh. The eccentricity of the main eccentric E equals $e=r-r1>0$; the eccentricity of the first auxiliary eccentric Ea equals ease; the eccentricity of the eccentrics Ei equals ea; the eccentricity of the second auxiliary eccentric Eb equals ea−e.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states:

54 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

55 $T_p(t)-e_a\,F_3(t)=0$ (equilibrium of the first auxiliary eccentric Ea);

56 $T_{r2}(t)+r_1 F_2=0$, $F_2+F_3=0$ (equilibrium of the planet gear PG);

57 $T_{r1}(t)-rF_2=0$ (equilibrium of the ring gear G);

58 $T_t(t)=i_t(t)T_p(t)$ (where $i_t(t)<0$);

Equations 54-58 immediately yield:

$$T_p(t) = \frac{-e_a}{r + e_a i_t(t)} TS(t); \qquad 59$$

$$T_{r2}(t) = \frac{-r_1}{r + e_a i_t(t)} TS(t). \qquad 60$$

EXAMPLE 11. Assume that the conventional torque converter is used having the characteristics as shown in FIG. 17; let $r=12, r_1=9, e=r-r_1=3, e_a=3.9$; then the following results are obtained: the transmission's output torque at stall $(n_2=0)$ $|T_{r2stall}|\approx 30$ TS, $|T_{r2min}|\approx 0.78$ TS.

Since the eccentricity ea of the first auxiliary eccentric Ea is not equal to the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb is non-zero, and the ring gear G of the eccentric gear set executes compound rotational-orbiting motion.

This transmission features large torque ratio spread equal even to [0.78; 30], which renders it useful for machines and vehicles subjected to loads varying within broad limits during operation process like for dozers, loaders, tactical vehicles, and farm tractors.

B. Second version (FIG. 13). Transmission according to the present invention 10 includes a conventional torque-multiplying torque converter 11 with turbine and impeller rotors rotating in mutually opposite directions, and a typical eccentric gear set 12 including a main externally toothed gear G having a first radius r (expressed in teeth normal module units), an internally toothed planet gear PG having a second radius r1 (expressed in teeth normal module units), and a main eccentric E supported for rotation relative the planet gear PG in the bearing BE, wherein the main gear's G shaft ShG is supported for rotation in a second auxiliary eccentric Eb, through a bearing BShGb, resp. BShGe; wherein the planet gear's PG shaft ShPG is supported for rotation in the first auxiliary eccentric Ea with the help of the bearing BPGa; wherein the main eccentric E keeps the main gear and the planet gear in permanent meshing. The transmission's input shaft ISh is connected to the main gear G through a constant velocity joint UJISh, while the main gear G is connected to the torque converter's 11 turbine rotor T with the help of a number of auxiliary eccentrics Ei; this connection causes the input shaft rotates in unison with the main gear G and the turbine rotor T (which executes purely rotational motion relative the transmission's body), while the whole eccentric gear 12 is free to execute orbiting motion relative the turbine rotor T; the main gear G is supported for rotation relative the transmission's body in a second auxiliary eccentric Eb. The transmission's output shaft OSh is connected with the planet gear PG of the eccentric gear set G through a universal joint UJOSh. The torque converter's impeller rotor P is connected rigidly with the first auxiliary eccentric Ea. The input shaft Ish is supported for rotation relative the transmission's 10 body in a bearing BIsh. The output shaft Osh is supported for rotation relative the transmission's 10 body in a bearing BOsh. The eccentricity of the main eccentric E equals e=r1−r>0; the eccentricity of the first auxiliary eccentric Ea equals ea≥e; the eccentricity of the eccentrics Ei equals ea; the eccentricity of the second auxiliary eccentric Eb equals ea−e.

The transmission's input shaft ISh is connected with shaft of a prime mover, typically an internal combustion engine (not shown).

Now a brief discussion of the operation (at equilibrium states) of the transmission follows.

During operation of the gear the following equations hold at equilibrium states:

61 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

62 $T_p(t)+e_a F_3(t)=0$ (equilibrium of the first auxiliary eccentric Ea);

63 $T_{r2}(t)+r_1 F_2=0$, $F_2+F_3=0$ (equilibrium of the planet gear PG);

64 $T_{r1}(t)-rF_2=0$ (equilibrium of the ring gear G);

65 $T_t(t)=i_t(t)T_p(t)$ (where $i_t(t)>0$);

Equations 62-65 immediately yield:

$$T_p(t) = \frac{e_a}{r - e_a i_t(t)} TS(t); \qquad 66$$

$$T_{r2}(t) = \frac{-r_1}{r - e_a i_t(t)} TS(t). \qquad 67$$

EXAMPLE 12. Assume that the conventional torque converter is used having the characteristics as shown in FIG. 17; let r=10, $r_1$=13, e=$r_1$−r=3, $e_a$=3.8; then the following results are obtained: the transmission's output torque at stall ($n_2$=0) $|T_{r2stall}|\approx108$ TS, $|T_{r2min}|\approx1.41$ TS.

Since the eccentricity ea of the first auxiliary eccentric Ea is not equal to the eccentricity e of the main eccentric E (expressed in units of normal module of teeth of the gears G and PG) equals the difference between the radius r of the ring gear G and the radius $r_s$ of the planet gear PG, the eccentricity eb of the second auxiliary eccentric Eb is non-zero, and the ring gear G of the eccentric gear set executes compound rotational-orbiting motion.

This transmission features extremely large torque ratio spread equal even to [1.41; 108], which renders it useful for machines and vehicles subjected to loads varying within broad limits during operation process like for dozers, loaders, tactical vehicles, and farm tractors.

Figure 14A:
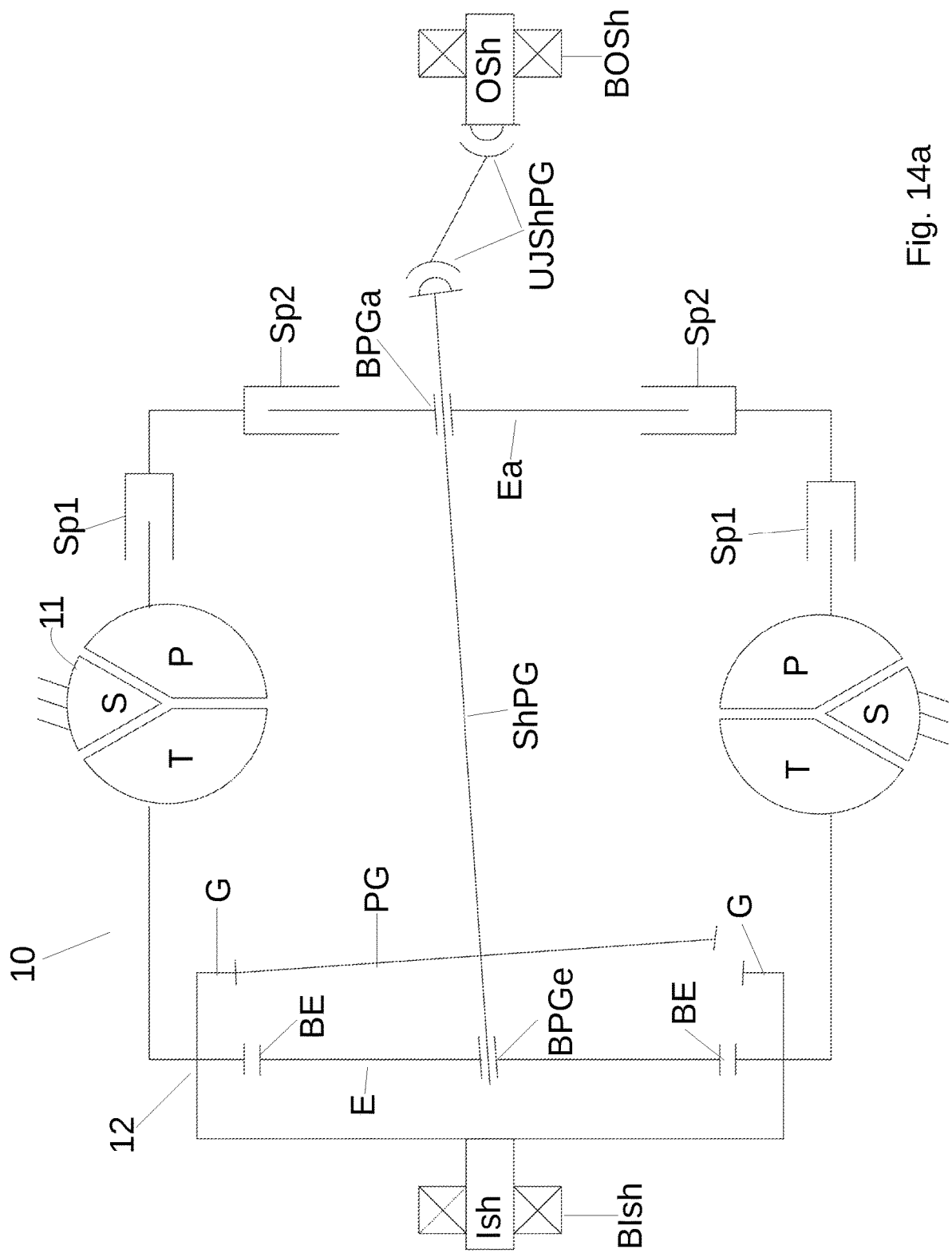
FIG. 14a shows schematically another configuration of the third version of the fourth preferred embodiment of the invention shown in FIG. 14.

C. Third version (FIGS. 14, 14a). This version of the transmission according to the present invention includes a conventional torque-multiplying torque converter 11 with turbine and impeller rotors rotating in the same direction, and a bevel eccentric gear set 12 including a main (ring) internally toothed bevel gear G, an externally toothed planet bevel gear PG, and a main eccentric E supported for rotation relative the main gear G in the bearing BE; wherein the main eccentric keeps the main gear and the planet gear in permanent meshing; wherein the planet gear's PG shaft ShPG is supported for rotation in the main eccentric E, resp. the first auxiliary eccentric Ea, with the help of the bearing BPGe, resp. BPGa, so that the planet gear's PG shaft ShPG is inclined relative the transmission's input shaft ISh and output shaft OSh at an acute angle α>0. The transmission input shaft ISh is connected rigidly to the main gear G and the torque converter's 11 turbine rotor T; the pump rotor P is connected to the first auxiliary eccentric Ea of special construction, through splines Sp1, Sp2, enabling change of said first auxiliary eccentric's Ea eccentricity ea by moving the first auxiliary eccentric Ea along the transmission's input shaft ISh, while the first auxiliary eccentric Ea constantly supports the planet gear's PG shaft ShPG in the bearing BPGa (wherein the bearing BPGa is made able to move radially along one fixed (relative the first auxiliary eccentric Ea) direction relative the first auxiliary eccentric Ea); the transmission output shaft OSh is connected with the planet gear PG of the eccentric gear set through a constant velocity joint UJOSh. The input shaft Ish is supported for rotation relative the transmission's 10 body in a bearing BIsh. The output shaft Osh is supported for rotation relative the transmission's 10 body in a bearing BOsh.

The transmission's input shaft ISh is connected with shaft of a prime mover, typically an internal combustion engine (not shown).

FIG. 14a shows the transmission with the first auxiliary eccentric Ea moved to the right relative its position shown in FIG. 14.

The discussion of the operation (at equilibrium states) of the first version of the fourth preferred embodiment of the transmission applies, almost literally, to this embodiment of the instant invention. The only essential novelty is that the eccentricity ea of the first auxiliary eccentric Ea is made variable (thus adding one more variable to the equilibrium equations 54-58), which makes characteristics of the transmission adaptable, and variable within broad limits.

EXAMPLE 13. Assume that the conventional torque converter is used having the characteristics as shown in FIG. 17; let r=12, $r_1$=9, e=r−$r_1$=3, $e_a$=3; then the following results are obtained: the transmission's output torque at stall ($n_2$=0) $|T_{r2stall}|$≈3 TS, $|T_{r2min}|$≈0.77 TS; by varying eccentricity of the first auxiliary eccentric Ea so that it achieves the value $e_a$=3.9 the following results are obtained: the transmission's output torque at stall ($n_2$=0) $|T_{r2stall}|$≈30 TS, $|T_{r2min}|$≈0.78 TS. Thus characteristics of this transmission can be varied within broad limits, which renders it useful for machines and vehicles destined for exploitation in various environments and subjected to loads varying in broad limits during operation process like e.g. for farm tractors and tactical vehicles.

Figure 15:
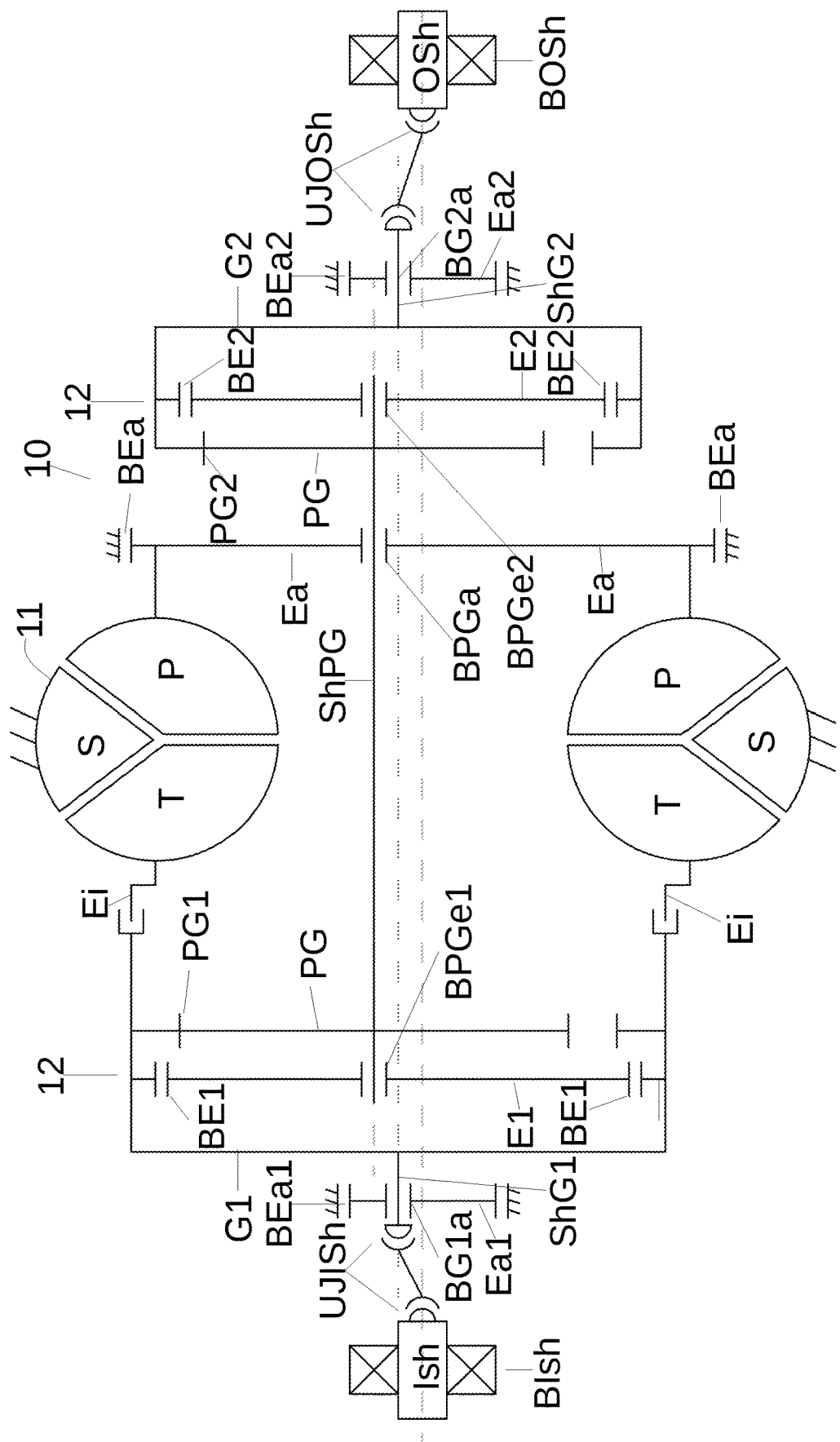
FIG. 15 shows schematically fifth preferred embodiment of the invention, in which an eccentric gear set with two main gears is applied.

Fifth Embodiment (FIG. 15)

Transmission according to the present invention 10 includes a conventional torque converter 11 (with turbine and impeller rotors rotating in mutually opposite directions); and a typical eccentric gear set 12 including two main (ring) internally toothed gears G1 and G2 having a first radius r1, resp a second radius r2 (expressed in units of the teeth's normal module), an externally toothed planet gear PG with two toothed wreaths PG1, PG2 having a third radius r3, resp a fourth radius r4 (expressed in units of the teeth normal module), three auxiliary eccentrics Ea1, Ea2, and Ea supported for rotation relative the transmission body in the bearings BEa1, BEa2, BEa respectively, two main eccentrics E1, E2 supported for rotation relative the first main gear G1, resp the second main gear G2 in the bearing BE1, resp. BE2, and secondary eccentrics Ei connecting the first main gear G1 and the torque converter turbine rotor T; wherein the first main gear G1 is supported for rotation relative the first auxiliary eccentric Ea1 in a bearing BG1a, wherein the second main gear G2 is supported for rotation relative the second auxiliary eccentric Ea2 in a bearing BG2a, wherein the planet gear PG is supported for rotation relative the first main eccentric E1, resp. the second main eccentric Ea2, resp. the auxiliary eccentric Ea, with the help of the bearing BPGe1, resp. BPGe2, resp. BPGa; wherein the first main eccentric E1 keeps the first main gear G1 and the planet gear's first toothed wreath PG1 in permanent meshing; wherein the second main eccentric E1 keeps the second main gear G2 and the planet gear's second toothed wreath PG2 in permanent meshing; wherein the auxiliary eccentric Ea is supported for rotation relative the transmission body in a bearing BEa. The transmission's input shaft ISh is connected through a first universal joint UJ1 to the first main gear G1 of the eccentric gear set 12, and to the torque converter's 11 turbine rotor T; the transmission's output shaft OSh is connected to the second main gear G2 of the eccentric gear set 12 through a second universal joint UJ2; the torque converter's 11 impeller rotor P is connected rigidly with the auxiliary eccentric Ea. The input shaft Ish is supported for rotation relative the transmission's 10 body in a bearing BIsh. The output shaft Osh is supported for rotation relative the transmission's 10 body in a bearing BOsh. The eccentricity of the main eccentric E equals e=r1−3=r2−r4>0; the eccentricity of the auxiliary eccentric Ea equals ea≥e.

The transmission's input shaft ISh is connected with a shaft of a prime mover, typically an internal combustion engine (not shown).

Now a discussion of the operation (at equilibrium states) of the transmission according to the instant invention follows.

Let PS(t) be the output power of the prime mover at the moment t, $P_c(t)$— the circulating power at the moment t, $P_o(t)$— the power on the transmission output shaft OSh, TS(t)—torque delivered by the prime mover at the moment t, $T_t(t)$—torque on the turbine rotor T at the moment t, $T_{r1}(t)$=TS(t)+$T_t(t)$—the resultant torque on the transmission input shaft ISh at the moment t, $T_p(t)$—torque on the impeller rotor P at the moment t, $T_{PG}(t)$—torque on the planet gear PG at the moment t, $F_1(t)$—force exerted on the planet gear PG by the first main gear G1 at the moment t, $F_2(t)$—force exerted on the planet gear PG by the second main gear G2 at the moment t, r1− distance between the point of application of force $F_1(t)$ and a first axis A1 of rotation of the main gear G1, r3—distance between the point of application of force $F_2(t)$ and a second axis A2 of rotation of the planet gear PG around its own longitudinal (movable) axis of symmetry, r2—distance between the point of application of force $F_2(t)$ and a third axis A3 of rotation of the second main gear G2 (coinciding with the first axis A1 of rotation of the first main gear G1), r4—distance between the point of application of force $F_2(t)$ and the second axis A2 of rotation of the planet gear PG around its own longitudinal (movable) axis of symmetry, wherein all the distances r1, r2, r3 and r4 are expressed in units of the normal module of teeth of the gears PG, G1 and G2; (thus r1/r3=z1/z3, where z1, resp. z3 is the number of teeth on the gear G1, resp. the toothed wraith PG1; and r2/r4=z2/z4, where z2, resp. z4 is the number of teeth on the gear G2, resp. the toothed wraith PG2), $F_3(t)$—force exerted on the planet gear's PG by the auxiliary eccentric Ea at the moment t, $n_1(t)$—rotational velocity of the first main gear G1 relative the transmission's body at the moment t (equal to the rotational velocity of the transmission's input shaft Ish and the torque converter's turbine rotor T), $n_2(t)$—rotational velocity of the second main gear G2 relative the transmission's body at the moment t (equal to the rotational velocity of the transmission's output shaft Osh), $n_3(t)$—rotational velocity of the auxiliary eccentric Ea relative the transmission's body at the moment t (equal to the rotational velocity of the torque converter's impeller rotor P), $n_4(t)$—rotational velocity of the planet gear PG of rotation around its own (movable) axis of rotation A2 at the moment t, $T_{r2}(t)$—the external torque on the transmission output shaft at the moment is $$t, i_s(t) = \frac{n_1(t)}{n_3(t)}$$

the torque converter speed ratio, $i_t(t)$ is the torque converter torque ratio, $\eta(i_s)$=$i_s(t)i_t(t)$ denotes the torque converter efficiency, $$i'_s(t) = \frac{n_2(t)}{n_1(t)}$$

is the transmission speed ratio, i'(t) is the transmission torque ratio, $\eta'(i_s')=i_s'(t)i_t'(t)$ denotes the overall transmission efficiency. During operation of the gear the following equations hold at equilibrium states:

68 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

69 $-r_1F_1+T_{r1}(t)=0$ (equilibrium of the ring gear G1);

70 $T_p(t)-e_aF_3(t)=0$ (equilibrium of the auxiliary eccentric Ea);

71 $r_3F_1+r_4F_2=0$, $F_1+F_2+F_3=0$ (equilibrium of the planet gear PG);

72 $-r_2F_2+T_{r2}(t)=0$ (equilibrium of the ring gear G2);

73 $T_t(t)=i_t(t)T_p(t)$ (where $i_t(t)>0$, since the turbine and the impeller rotors rotate in mutually inverse directions);

$$n_2(t_1) = \frac{r_1 r_2}{r_3 r_4} n_1(t_1) + \left(1 - \frac{r_1 r_2}{r_3 r_4}\right) n_3(t_1); \quad 74$$

$$\eta(i_s) = i_s i_t; \quad 75$$

$$\eta'(i_s') = i_t' i_s'; \quad 76$$

Equations 68-73 immediately yield:

$$T_p(t) = e_a \frac{(r_4 - r_3)}{e_a i_t(t)(r_3 - r_4) - r_1 r_4} TS(t); \quad 77$$

$$T_{r2}(t) = \frac{(r_3 r_2)}{e_a i_t(t)(r_3 - r_4) - r_1 r_4} TS(t) \quad 78$$

$$\eta'(t) = \frac{r_1 r_4 + \frac{r_3 r_2 - r_1 r_4}{i_s}}{(e_a i_t (r_3 - r_4) - r_1 r_4)}. \quad 79$$

The transmission according to the instant invention features strong positive feedback between the rotors of pump and turbine, which translates to exceptionally large torque at stall and exceptionally large range of torque ratio variation: Since the turbine is connected directly to the transmission's input shaft (connected to shaft of a prime mover), the fluid pumped by the pump, after its angular momentum is changed by the torque converter's stator, enters the turbine rotor, and generates torque and power that add to the torque and power delivered by a prime mover; then the turbine drives the pump with greater power and torque, the pump generates the fluid flow of greater power and angular momentum, which, when enters the turbine rotor, generates still larger power and torque on the transmission's input shaft, and so on ad infinitum; this is the phenomenon of power circulation; had the torque converter's efficiency be equal to 1 this positive feedback loop would be unfading, thus causing the circulating power and torque on the output shaft rise to infinity; since the torque converter's efficiency is smaller than 1, the feedback between the pump and turbine rotors fades, subsequent increments of power and torque added by the fluid to the total power and torque on the input shaft tends to zero, which results in finite torque and power on the transmission's input and output shafts.

Since the rotation speed of the turbine rotor equals the rotation speed of the prime mover shaft, this transmission operates at relatively large rotational speeds of the torque converter rotors.

EXAMPLE 14. Assume that the standard torque converter is used having the characteristics as shown in FIG. 17; let $r_1=5$, $r_3=5$, $r_2=3$, $r_4=2$, $e_a=1.4$; then the following results are obtained: the transmission's output torque at stall ($n_2=0$) $T_{r2stall}=-60$ TS, and for $n_2=0.65$ $n_1$ $T_{r2}\approx1.39$ TS, $\eta'=0.9$; thus the torque ratio spread of this transmission equals x–43x. Since the eccentricity ea of the first auxiliary eccentric Ea is not equal to the eccentricity e of the main eccentric E (expressed in units of normal module of teeth of the gears G and PG; e equals the difference between the radius $r_1$ of the ring gear G1 and the radius $r_3$ of the planet gear PG), the eccentric gear set executes orbiting motion relative the transmission body.

Figure 16:
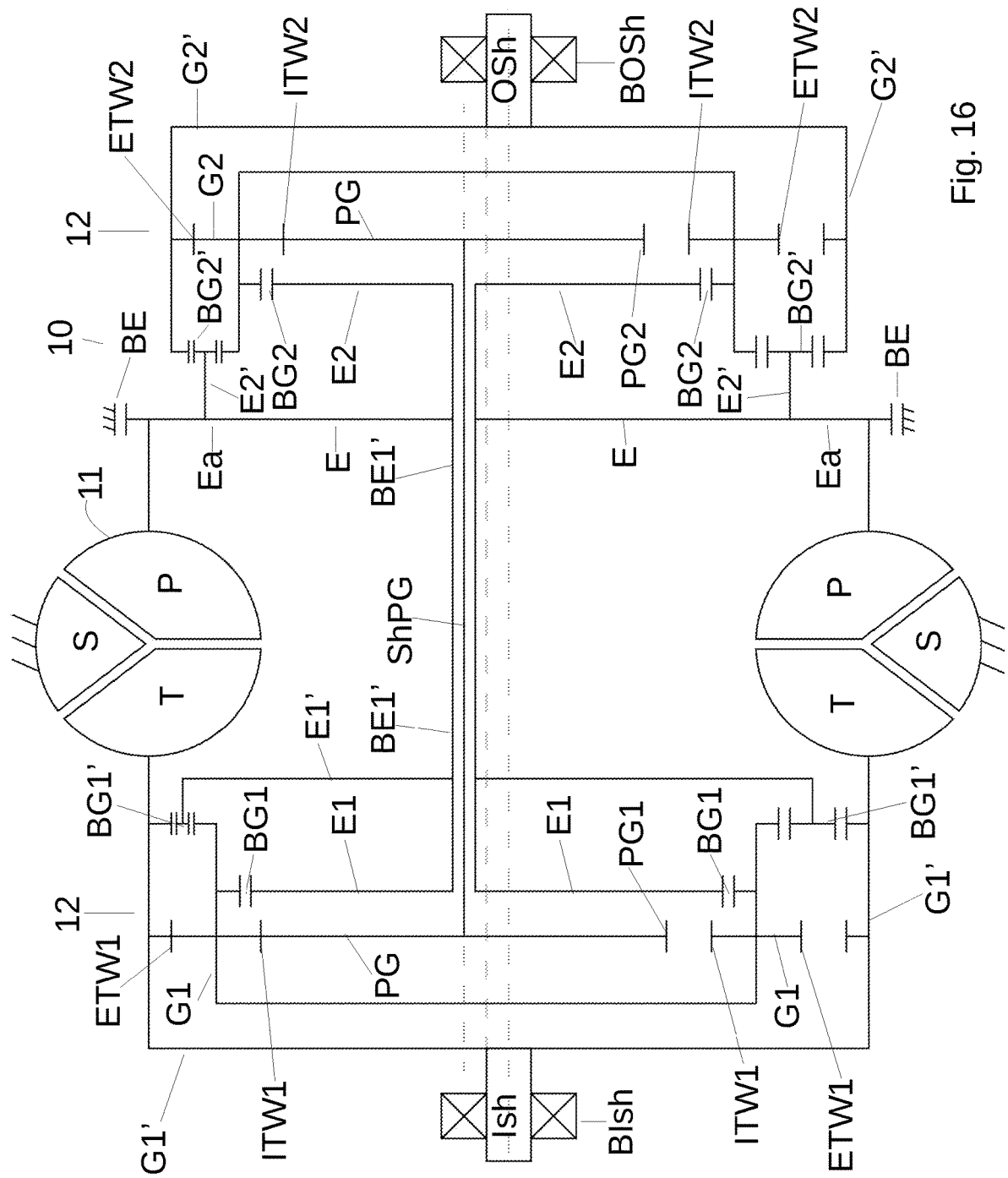
FIG. 16 shows schematically sixth preferred embodiment of the invention, in which orbiting motion of eccentric gear set (and thus vibrations) is eliminated by applying a double eccentric gear set.

Sixth Embodiment (FIG. 16)

Transmission according to the present invention 10 includes a conventional torque converter 11 (with turbine and impeller rotors rotating in mutually opposite directions); and a double eccentric gear set 12 including a first main ring gear G1, resp. a second main ring G2, having an internal ITW1, resp. ITW2 toothed wreath, and external ETW1, resp. ETW2 toothed wreath having a first internal radius r1 and a first external radius r1', resp a second internal radius r2 and a second external radius r2' (expressed in units of the teeth normal module), an externally toothed planet gear PG with two toothed wreaths PG1, PG2, connected by a shaft ShPG, having a third radius r3, resp a fourth radius r4 (expressed in units of the teeth normal module), two secondary (ring) internally toothed gears Gr, resp. G2', having a fifth internal radius ri, resp a sixth internal radius ro, two main eccentrics E1, E2, two secondary eccentrics E1', E2', and an auxiliary eccentric Ea; wherein all the eccentrics E1, E2, E1', E2', and the auxiliary eccentric Ea are made as a unique whole to form a compound eccentric E; wherein the first main eccentric E1 keeps the internal toothed wreath ITW1 of the first main gear G1 and the planet gear's first toothed wreath PG1 in permanent meshing; wherein the second main eccentric E1 keeps the internal toothed wreath ITW2 of the second main gear G2 and the planet gear's second toothed wreath PG2 in permanent meshing; wherein the first secondary eccentric E1' keeps the first secondary gear G1' and the first main gear G1 external toothed wreath ETW1 in permanent meshing; wherein the second secondary eccentric E2' keeps the second secondary gear G2' and the second main gear G2 external toothed wreath ETW2 in permanent meshing; wherein the first secondary eccentric E1', resp the second secondary eccentric E2', is supported for rotation relative the transmission body in the bearing BE1', resp. BE2'; wherein the first secondary eccentric E1', resp the second secondary eccentric E2', is supported for rotation relative the first secondary gear Gr, resp. the second secondary gear G2', in the bearing BG1', resp. BG2'; wherein the first main eccentric E1, resp the second main eccentric E2, is supported for rotation relative the first main gear G1, resp. the second main gear G2, in the bearing BG1, resp. BG2; wherein the planet gear PG is supported for rotation relative the first main eccentric E1, the second main eccentric E2, and the auxiliary eccentric Ea, with the help of the bearing BPGe; wherein the eccentric E is supported for rotation relative the transmission body in a bearing BE. The transmission's input shaft ISh is connected rigidly to the first secondary ring gear G1' of the eccentric gear set 12, and to the torque converter's 11 turbine rotor T; the transmission's output shaft OSh is connected rigidly to the second secondary gear G2' of the eccentric gear set 12; the torque converter's 11 impeller rotor P is connected rigidly with the auxiliary eccentric Ea. The input shaft Ish is supported for rotation relative the transmission's 10 body in a bearing BIsh. The output shaft Osh is supported for rotation relative the transmission's 10 body in a bearing BOsh. The eccentricity of the main eccentrics E1, E2 equals $e=r_1-r_3=r_2-r_4>0$; the eccentricity of the secondary eccentrics E1', E2' equals $e'=r_i-r_1'=r_o-r_2'>0$; the eccentricity of the auxiliary eccentric Ea equals $e_a=e+e'$.

The transmission's input shaft ISh is connected with a shaft of a prime mover, typically an internal combustion engine (not shown).

Now a discussion of the operation (at equilibrium states) of the transmission according to the instant invention follows.

Let PS(t) be the output power of the prime mover at the moment t, $P_c(t)$—the circulating power at the moment t, $P_o(t)$—the power on the transmission output shaft OSh, TS(t)—torque delivered by the prime mover at the moment t, $T_t(t)$—torque on the turbine rotor T at the moment t, $T_{r1}(t)=TS(t)+T_t(t)$—the resultant torque on the transmission input shaft ISh at the moment t, $T_p(t)$—torque on the impeller rotor P at the moment t, $T_{PG}(t)$—torque on the planet gear PG at the moment t, $F_1(t)$—force exerted on the planet gear PG by the first main gear G1 at the moment t, $F_2(t)$—force exerted on the planet gear PG by the second main gear G2 at the moment t, $F_i(t)$—force exerted on the first main gear G1 by the first secondary gear G1' at the moment t, $F_o(t)$—force exerted on the second main gear G2 by the second secondary gear G2' at the moment t; thus r1 is the distance between the point of application of the force $F_1(t)$ and a first longitudinal axis A1 of symmetry of both the main gears G1, G2, r2 is the distance between the point of application of the force $F_2(t)$ and the first longitudinal axis A1 of symmetry of the main gears G1, G2, r3 is the distance between the point of application of the force $F_1(t)$ and a second longitudinal axis A2 of symmetry of the planet gear PG, r4 is the distance between the point of application of the force $F_2(t)$ and the second longitudinal axis A2 of symmetry of the planet gear PG, r1' is the distance between the point of application of force F; (t) and the first longitudinal axis A1 of symmetry of both the main gears G1, G2, r2' is distance between the point of application of the force $F_o(t)$ and the first longitudinal axis A1 of symmetry of both the main gears G1, G2, ri is the distance between the point of application of the force $F_i(t)$ and a third longitudinal axis A3 of both the secondary gears Gr, G2' of the eccentric gear set 12, ro is the distance between the point of application of the force $F_o(t)$ and a third longitudinal axis of symmetry A3 of both the secondary gears Gr, G2' of the eccentric gear set 12, wherein all the distances r1, r1', r2, r2', r3 and r4 are expressed in units of the normal module of teeth of the gears PG, G1, G1', G2, and G2'; $F_3(t)$ is the force exerted on the planet gear PG by the auxiliary eccentric Ea at the moment t, $F_4(t)$ is the force exerted on the first main gear G1 by the eccentric E at the moment t, $F_5(t)$ is the force exerted on the second main gear G2 by the eccentric E at the moment t, $n_i(t)$ is the rotational velocity of the first secondary gear G1' relative the transmission's body at the moment t (equal to the rotational velocity of the transmission's input shaft Ish and the torque converter's turbine rotor T), $n_o(t)$ is the rotational velocity of the second secondary gear G2' relative the transmission's body at the moment t (equal to the rotational velocity of the transmission's output shaft Osh), $n_1(t)$ is the rotational velocity of the first main gear G1 relative the transmission's body at the moment t, $n_2(t)$ is the rotational velocity of the second main gear G2 relative the transmission's body at the moment t $n_3(t)$ is the rotational velocity of the auxiliary eccentric Ea relative the transmission's body at the moment t (equal to the rotational velocity of the torque converter's impeller rotor P), $n_4(t)$—rotational velocity of the planet gear PG of rotation around its own (movable) axis of rotation A2 at the moment t, $T_{r2}(t)$—the external torque on the transmission output shaft at the moment $$t, i_s(t) = \frac{n_i(t)}{n_3(t)}$$

is the torque converter speed ratio, $i_t(t)$ is the torque converter torque ratio, $\eta(i_s)=(t)i_t(t)$ denotes the torque converter efficiency, $$i'_s(t) = \frac{n_o(t)}{n_i(t)}$$

is the transmission speed ratio, $i_t'(t)$ is the transmission torque ratio, $\eta'(i_s')=i_s'(t)i_t'(t)$ denotes the overall transmission efficiency. During operation of the gear the following equations hold at equilibrium states:

80 $T_{r1}(t)=TS(t)+T_t(t)$ (principal equation characterizing transmission according to the present invention: the resultant torque on the transmission input shaft is the sum of the torque on the prime mover shaft and the torque on the turbine rotor);

81 $-r_iF_i+_{r1}(t)=0$ (equilibrium of the ring gear G1');

82 $-r_oF_o+T_{r2}(t)=0$ (equilibrium of the ring gear G2');

83 $r_1'F_i-r_1F_1=0, r_iF_i-(r_1+e')F_1+e'F_4=0$ (equilibrium of the ring gear G1);

84 $r_2'F_o-r_2F_2=0, r_oF_o-(r_2+e')F_1+e'F_5=0$ (equilibrium of the ring gear G2);

85 $T_p(t)-e_a(F_3+F_4+F_5)=0$ (equilibrium of the eccentric E);

86 $r_3F_1+r_4F_2=0, r_1F_1+r_2F_2+eF_3=0$ (equilibrium of the planet gear PG);

87 $T_t(t)=i_t(t)T_p(t)$ (where $i_t(t)>0$, since the turbine and the impeller rotors rotate in mutually inverse directions);

$$n_3(t) = \frac{r_1 r_3 r_i r_2'}{r_1' r_2'(r_1 r_4 - r_3 r_2) + r_1' r_3 r_2(r_2' - r_o) - r_2' r_1 r_3(r_1' - r_i)} n_i(t) - \frac{r_3 r_2 r_o r_1'}{r_1' r_2'(r_1 r_4 - r_3 r_2) + r_1' r_3 r_2(r_2' - r_o) - r_2' r_1 r_3(r_1' - r_i)} n_0(t) \quad 88$$

$$\eta(i_s) = i_s i_t; \quad 89$$

$$\eta'(i_s') = i_t' i_s'; \quad 90$$

Equations 81-87 immediately yield:

$$T_p(t) = \frac{-e r_o r_1 r_2}{r_i r_o r_1 r_2 + e r_o r_1 r_2 i_t} T_s(t) - \frac{-e r_i r_1 r_2}{r_i r_o r_1 r_2 + e r_o r_1 r_2 i_t} T_{r2}(t); \quad 91$$

$$T_{r2}(t) = \frac{r_1' r_3 r_o r_2}{-r_i r_4 r_1 r_2' + e i_t(r_1' r_3 r_2 - r_4 r_1 r_2')} T_s(t). \quad 92$$

EXAMPLE 15. Assume that the standard torque converter is used having the characteristics as shown in FIG. 17; Let $r_1=6.9=r_2$, $r_3=4.6=r_4$, $r_1'=9$, $r_i=11$, $r_2'=6$, $r_o=8$, $e=2$, $e'=2.3$, $e_a=4.3$; then the following results are obtained: the transmission's output torque at stall ($n_2=0$)$T_{r2stall}$–48 TS, and for $n_2=0.83\ n_1$ $T_{r2}\approx-1.135$ TS, $\eta'=0.94$. The torque ratio spread of this transmission equals x–42.3x, which would be sufficient for most applications.

Those skilled in the art of hydro-mechanical transmissions would easily recognize that many changes can be made to the presented preferred embodiments of the invention without departing from its true nature and spirit.

I claim:

1. A hydro-mechanical transmission includes at least: a body; an input shaft supported for rotation relative said body around a first axis of rotation; an output shaft supported for rotation relative said body around a second axis of rotation; a hydrodynamic torque converter having at least a turbine rotor, a pump rotor, and a stator secured against rotation relative the body; and an eccentric gear set; wherein the eccentric gear set includes at least a first main gear, a planet gear, a first main eccentric, and a first auxiliary eccentric; wherein the planet gear has at least first toothed wreath meshing with the first main gear; wherein the first main eccentric has a first eccentricity; wherein the first auxiliary eccentric has a second eccentricity; wherein the first main gear has a first number of teeth having a first normal module, and the first toothed wreath of the planet gear has a second number of teeth having the first normal module; wherein the first eccentricity of the first main eccentric expressed in units of the normal module of teeth of the first main gear and the planet gear equals half the absolute value of the difference between the number of teeth of the first main gear and the number of teeth of the first toothed wreath of the planet gear; wherein the first main eccentric is supported for rotation relative the body around a third axis of rotation; wherein the first main eccentric keeps the first main gear and the first toothed wreath of the planet gear in permanent meshing; wherein the first auxiliary eccentric is supported for rotation relative the body around the third axis of rotation; wherein the intermediate shaft is supported for rotation in the main eccentric and the first auxiliary eccentric so that it is free to rotate relative the main eccentric and the first auxiliary eccentric around a fourth axis of rotation, and the fourth axis of rotation is free to rotate relative the third axis of rotation; wherein the input shaft is connected with the turbine rotor so that the input shaft and the turbine rotor both rotate in unison relative the body.

2. The hydro-mechanical transmission according to claim 1, wherein the eccentricity of the first auxiliary eccentric is not equal to the eccentricity of the first main eccentric.

3. The hydro-mechanical transmission according to claim 1, wherein the first main gear and the planet gear of the eccentric gear set are both bevel gears; wherein the fourth axis of rotation of the intermediate shaft relative the first main eccentric and the first auxiliary eccentric is inclined relative the third axis of rotation of the first main eccentric and the first auxiliary eccentric relative the body at a non-zero angle.

4. The hydro-mechanical transmission according to claim 3, wherein the eccentricity of the first auxiliary eccentric is variable.

5. The hydro-mechanical transmission according to claim 4, wherein the first auxiliary eccentric is movable along the intermediate shaft.

6. The hydro-mechanical transmission according to claim 1, wherein the input shaft is connected with the turbine rotor and the first auxiliary eccentric so that the input shaft, the turbine rotor, and the first auxiliary eccentric all rotate in unison relative the body; wherein the output shaft is connected with the first main gear so that the output shaft and the first main gear both rotate in unison relative the body; wherein the pump rotor is connected with the intermediate shaft so that the pump rotor, the intermediate shaft, and the planet gear all rotate relative the main eccentric and the first auxiliary eccentric around the fourth axis of rotation.

7. The hydro-mechanical transmission according to claim 6, wherein the pump rotor is connected with the intermediate shaft through a speed-reducing gear.

8. The hydro-mechanical transmission according to claim 1, wherein the input shaft is connected with the turbine rotor and the first auxiliary eccentric so that the input shaft, the turbine rotor, and the first auxiliary eccentric all rotate in unison relative the body; wherein the planet gear is connected rigidly with the intermediate shaft; wherein the output shaft is connected with the planet gear so that the output shaft and the planet gear both rotate in unison relative the body;

wherein the pump rotor is connected with the main gear.

9. The hydro-mechanical transmission according to claim 8, wherein the pump rotor is connected with the main gear through a speed-reducing auxiliary gear.

10. The hydro-mechanical transmission according to claim 1, wherein the input shaft is connected with the turbine rotor and the intermediate shaft so that the input shaft, the turbine rotor, and the planet gear all rotate in unison relative the body; wherein the output shaft is connected with the first main gear so that the output shaft and the first main gear both rotate in unison relative the body; wherein the pump rotor is connected with the first auxiliary eccentric.

11. The hydro-mechanical transmission according to claim 1, wherein the input shaft is connected with the turbine rotor and the first main gear so that the input shaft, the turbine rotor, and the first main gear all rotate in unison relative the body; wherein the output shaft is connected with the intermediate shaft so that the output shaft and the planet gear both rotate in unison relative the body; wherein the pump rotor is connected with the first auxiliary eccentric.

12. The hydro-mechanical transmission according to claim 1, wherein the eccentric gear set includes the first main gear and a second main gear; wherein the planet gear has the first toothed wreath and a second toothed wreath; wherein the eccentric gear set includes a second auxiliary eccentric supported for rotation relative the transmission body, and a third auxiliary eccentric supported for rotation relative the transmission body, and a second main eccentric supported for rotation relative the second main gear; wherein the second main gear is supported for rotation relative the second auxiliary eccentric; wherein the planet gear is supported for rotation relative the first main eccentric and the second main eccentric; wherein the second main eccentric keeps the second main gear and the planet gear's second toothed wreath in permanent meshing; wherein the transmission's input shaft is connected to the first main gear of the eccentric gear and to the torque converter's turbine rotor; wherein the transmission's output shaft is connected to the second main gear of the eccentric gear set; wherein the torque converter's impeller rotor is connected rigidly to the first auxiliary eccentric.

13. The hydro-mechanical transmission according to claim 12, wherein the eccentric gear set includes a first secondary gear, a second secondary gear, a first secondary eccentric, and a second secondary eccentric; wherein the first main ring gear has a first internal toothed wreath, and a first external toothed wreath; wherein the second main ring gear has a second internal toothed wreath, and a second external toothed wreath; wherein the first secondary eccentric keeps the first secondary gear and the first main gear external toothed wreath in permanent meshing; wherein the second secondary eccentric keeps the second secondary gear and the second main gear external toothed wreath in permanent meshing; wherein the first secondary eccentric and the second secondary eccentric are both supported for rotation relative the transmission body; wherein the first secondary eccentric is supported for rotation relative the first secondary gear; wherein the second secondary eccentric is supported for rotation relative the second secondary gear; wherein the transmission's input shaft is connected to the first secondary ring gear of the eccentric gear set and to the torque converter's turbine rotor; wherein the transmission's output shaft is connected to the second secondary gear of the eccentric gear set.

* * * * *